United States Patent
John Wilson et al.

(10) Patent No.: US 10,554,470 B2
(45) Date of Patent: Feb. 4, 2020

(54) CONTROL MONITORING AND POWER CONTROL FOR MULTI-LINK DEPLOYMENTS

(71) Applicant: QUALCOMM Incorporated, San Diego, CA (US)

(72) Inventors: Makesh Pravin John Wilson, San Diego, CA (US); Tao Luo, San Diego, CA (US); Xiaoxia Zhang, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/218,737

(22) Filed: Dec. 13, 2018

(65) Prior Publication Data

US 2019/0199571 A1 Jun. 27, 2019

Related U.S. Application Data

(60) Provisional application No. 62/609,212, filed on Dec. 21, 2017.

(51) Int. Cl.
*H04L 27/26* (2006.01)

(52) U.S. Cl.
CPC ...... *H04L 27/2689* (2013.01); *H04L 27/2657* (2013.01); *H04L 27/2666* (2013.01)

(58) Field of Classification Search
CPC ............. H04L 27/2657; H04L 27/2666; H04L 27/2689; H04L 43/08; H04W 72/042; H04W 88/02; H04B 1/7083

(Continued)

(56) References Cited

U.S. PATENT DOCUMENTS 6,252,865 B1 * 6/2001 Walton ............... H04W 52/50
                                                           370/335
7,751,467 B2 * 7/2010 Cozzo ............... H04B 1/7113
                                                           375/136

(Continued)

FOREIGN PATENT DOCUMENTS

WO    WO-2015116866 A1    8/2015

OTHER PUBLICATIONS

Huawei et al., "Search Space and Blind Decoding Design", 3GPP Draft, R1-1712183, 3RD Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315000, 6 Pages, Retrieved from the Internet: URL:http://www.3gpp.org/ftp/Meetings_3GPP_SYNC/RAN1/Docs/ [retrieved on Aug. 20, 2017], Sections 1 and 2.4.

(Continued)

*Primary Examiner* — Emmanuel Bayard
(74) *Attorney, Agent, or Firm* — Linda G. Gunderson; Holland & Hart LLP

(57) ABSTRACT

Methods, systems, and devices for wireless communications are described. A user equipment (UE) may be in communication with multiple base stations having a non-ideal backhaul link, where uplink and downlink transmission on a carrier may be sent on respective communication links. The transmissions may be synchronous or asynchronous, and the UE may identify a set of search candidates in overlapping TTIs associated with downlink transmissions from respective base stations. In some cases, a number or a timing of the set of search candidates may be based on the overlapping TTIs. The UE may also use different uplink transmit powers for transmissions on the different communication links. In some cases, a minimum reserved power may be used for each link where a remaining transmit power, for example, up (Continued)

to a maximum total transmit power, may be split between the links or applied to the uplink transmission that occurs temporally first.

58 Claims, 19 Drawing Sheets

(58) Field of Classification Search
USPC .................................. 375/219–222, 260, 356
See application file for complete search history.

(56) References Cited

U.S. PATENT DOCUMENTS

| | | | |
|---|---|---|---|
| 10,057,894 B2* | 8/2018 | Ode | H04W 72/0453 |
| 2006/0013245 A1* | 1/2006 | Abedi | H04L 47/14 |
| | | | 370/433 |
| 2009/0252075 A1* | 10/2009 | Ji | H04W 56/00 |
| | | | 370/312 |
| 2013/0265892 A1* | 10/2013 | Fernando | H04L 5/001 |
| | | | 370/252 |
| 2015/0189568 A1* | 7/2015 | Stanze | H04W 16/28 |
| | | | 370/331 |
| 2015/0208425 A1* | 7/2015 | Caretti | H04W 72/082 |
| | | | 370/336 |
| 2016/0183135 A1* | 6/2016 | Kang | H04W 76/15 |
| | | | 455/444 |
| 2016/0277174 A1* | 9/2016 | Burnic | H04W 56/0035 |
| 2016/0301509 A1* | 10/2016 | Narasimha | H04L 1/1861 |
| 2017/0289816 A1* | 10/2017 | Naden | H04B 7/15542 |
| 2017/0325164 A1* | 11/2017 | Lee | H04W 52/0216 |
| 2018/0049175 A1* | 2/2018 | Bagheri | H04L 5/0048 |
| 2018/0249476 A1* | 8/2018 | Miao | H04W 36/00 |
| 2018/0367265 A1* | 12/2018 | Wang | H04L 5/006 |
| 2019/0053081 A1* | 2/2019 | Bagheri | H04L 5/001 |

OTHER PUBLICATIONS

Interdigital et al., "Power Control Modes for NR DC and NR CA", 3GPP Draft, R1-1718366 (R15 NR WI AI 762 NR UL PCM), 3RD Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341549, 7 Pages, Retrieved from the Internet: URL:http://www.3gpp.org/ftp/Meetings_3GPP_SYNC/RAN1/Docs/ [retrieved on Oct. 8, 2017], Sections 2 and 2.1.
Interdigital Inc: "DCI Design for Multi-TRP/Panel Transmission for DL", 3GPP Draft, R1-1714138 DCI Design for Multi-TRP Panel Transmission for DL, 3RD Generation Partnership Project (3GPP), Mobile Competence Centre, 650, Route Des Lucioles, F-06921 Sophia-Antipolis Cede, vol. RAN WG1, No. Prague, Czech Republic, Aug. 21, 2017-Aug. 25, 2017, Aug. 20, 2017 (Aug. 20, 2017), XP051316927, 3 Pages, Retrieved from the Internet: URL:http://www.3gpp.org/ftp/Meetings_3GPP_SYNC/RAN1/Docs/ [retrieved on Aug. 20, 2017], Section 2.
Partial International Search Report—PCT/US2018/066056—ISA/EPO—dated Apr. 4, 2019.
International Search Report and Written Opinion—PCT/US2018/066056—ISA/EPO—dated May 28, 2019.

* cited by examiner

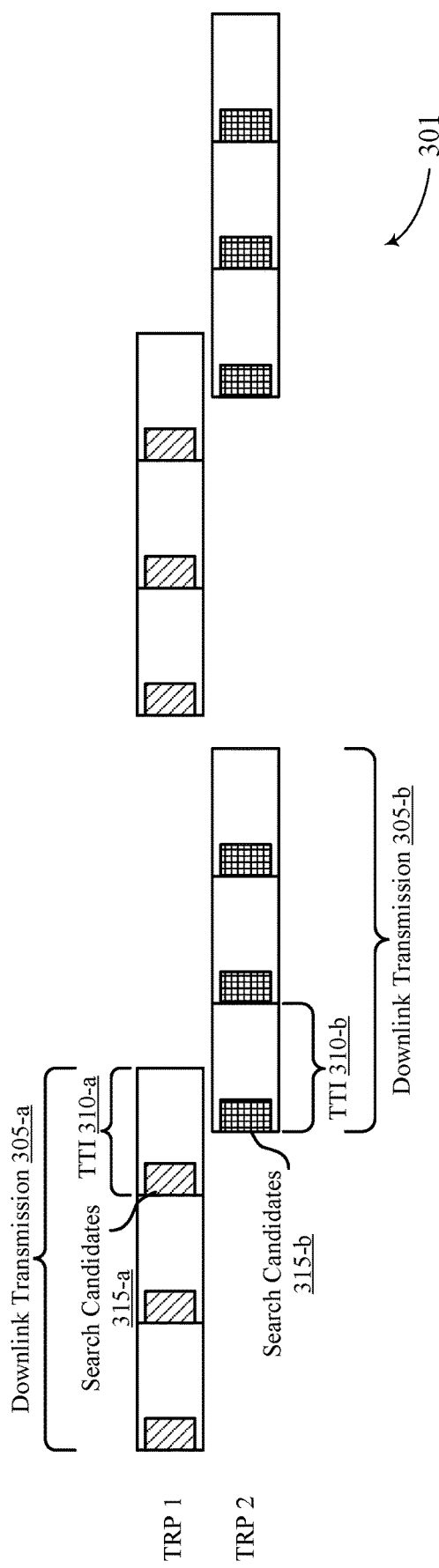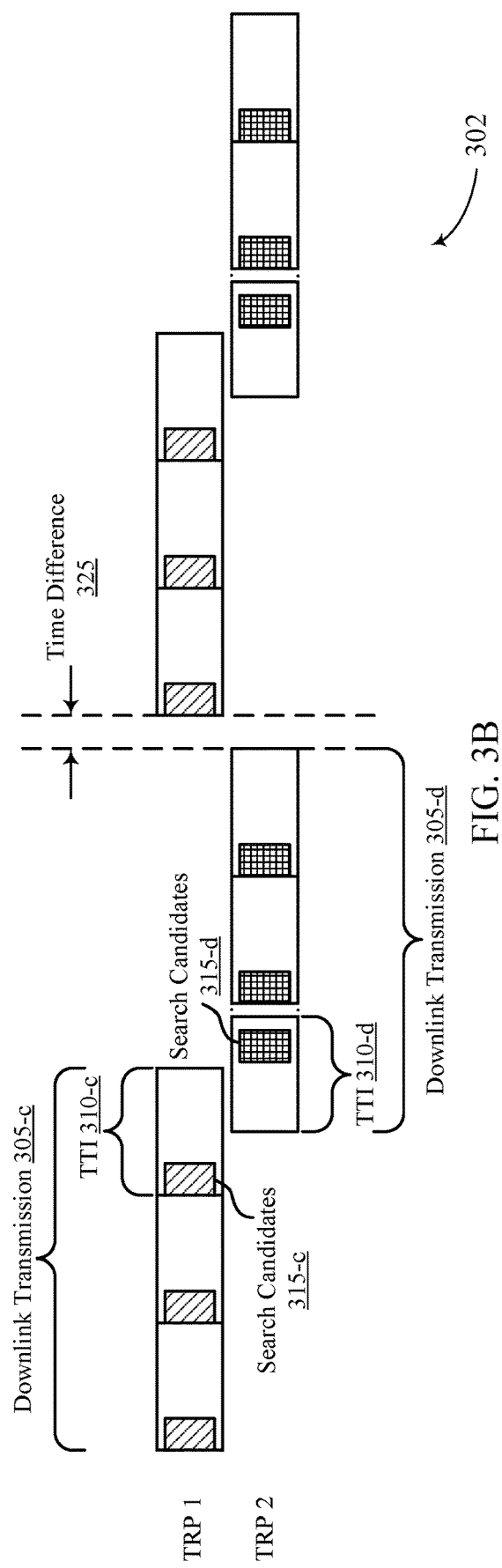

CONTROL MONITORING AND POWER CONTROL FOR MULTI-LINK DEPLOYMENTS

CROSS REFERENCES

The present Application for patent claims the benefit of U.S. Provisional Patent Application No. 62/609,212 by John Wilson et al., entitled "CONTROL MONITORING AND POWER CONTROL FOR MULTI-LINK DEPLOYMENTS," filed Dec. 21, 2017, assigned to the assignee hereof, and expressly incorporated by reference in its entirety.

BACKGROUND

The following relates generally to wireless communication, and more specifically to control monitoring and power control for multi-link deployments.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may simultaneously connect to and communicate with multiple transmission/reception points (TRPs) (e.g., base stations). For example, the UE may communicate with different base stations using respective communication links on a same carrier. However, those base stations may lack an ideal backhaul link, and may be unable to efficiently coordinate, for example, downlink transmissions sent to the UE. Consequently, the non-ideal backhaul link between the different base stations may affect the UE's ability to efficiently communicate.

SUMMARY

The described techniques relate to improved methods, systems, devices, or apparatuses that support control monitoring and power control for multi-link deployments. Generally, the described techniques provide for control resource set monitoring and uplink power control in communications with multiple transmission/reception points (TRPs). For example, a user equipment (UE) may communicate simultaneously with two or more base stations, where uplink and downlink transmissions on a carrier may be sent on respective communication links (e.g., beam link pairs) with each base station. In some cases, a backhaul link between the base stations may not be ideal. As a result, transmission time intervals (TTIs) of respective transmissions from different base stations may at least partially overlap. The UE may accordingly identify a set of search candidates for downlink control information (DCI) during such overlapping TTIs on a same carrier, where a configuration of a number or timing of search candidates may be based on the overlapping TTIs. For example, different overlapping TTIs may have a restricted number of search candidates in each TTI with respect to non-overlapping TTIs. Additionally or alternatively, the search candidates may be time-shifted in one of the overlapping TTIs such that a control resource set (e.g., a CORESET) in a TTI associated with a first base station may not overlap with (or may be orthogonal in time to) another TTI associated with another base station.

In some cases, the UE may use different uplink transmit powers for uplink communications on different communication links. For example, a base station may configure a power control mode for the UE to use with uplink transmissions to different base stations (e.g., on respective communication links). The power control mode may include a minimum reserved power that is split between different communications links, where an additional (or a remaining transmit power, for example, up to a maximum total transmit power) may be split between the links. Additionally or alternatively, the remaining power may be applied to an uplink transmission that occurs temporally first.

A method of wireless communication is described. The method may include receiving a first downlink transmission from a first base station via a first communication link, the first downlink transmission received on a carrier during a first TTI, receiving a second downlink transmission from a second base station via a second communication link, the second downlink transmission received on the carrier during a second TTI, where the first TTI and the second TTI at least partially overlap, identifying a set of search candidates within the first TTI and within the second TTI, where a number or timing of the set of search candidates is based on the first TTI and the second TTI partially overlapping, and monitoring the set of search candidates for respective control information from the first base station and the second base station.

An apparatus for wireless communication is described. The apparatus may include means for receiving a first downlink transmission from a first base station via a first communication link, the first downlink transmission received on a carrier during a first TTI, means for receiving a second downlink transmission from a second base station via a second communication link, the second downlink transmission received on the carrier during a second TTI, where the first TTI and the second TTI at least partially overlap, means for identifying a set of search candidates within the first TTI and within the second TTI, where a number or timing of the set of search candidates is based on the first TTI and the second TTI partially overlapping, and means for monitoring the set of search candidates for respective control information from the first base station and the second base station.

Another apparatus for wireless communication is described. The apparatus may include a processor, memory in electronic communication with the processor, and instructions stored in the memory. The instructions may be operable to cause the processor to receive a first downlink transmission from a first base station via a first communication link, the first downlink transmission received on a carrier during a first TTI, receive a second downlink transmission from a second base station via a second communication link, the second downlink transmission received on the carrier during a second TTI, where the first TTI and the second TTI at least partially overlap, identify a set of search candidates within the first TTI and within the second TTI, where a number or timing of the set of search candidates is based on the first TTI and the second TTI partially overlapping, and monitor the set of search candidates for respective control information from the first base station and the second base station.

A non-transitory computer-readable medium for wireless communication is described. The non-transitory computer-readable medium may include instructions operable to cause a processor to receive a first downlink transmission from a first base station via a first communication link, the first downlink transmission received on a carrier during a first TTI, receive a second downlink transmission from a second base station via a second communication link, the second downlink transmission received on the carrier during a second TTI, where the first TTI and the second TTI at least partially overlap, identify a set of search candidates within the first TTI and within the second TTI, where a number or timing of the set of search candidates is based on the first TTI and the second TTI partially overlapping, and monitor the set of search candidates for respective control information from the first base station and the second base station.

In some examples of the method, apparatus, and non-transitory computer-readable medium described herein, identifying the set of search candidates includes identifying a restricted number of search candidates within each of the first TTI and the second TTI with respect to non-overlapping TTIs received by the UE from the first base station and the second base station. In some examples of the method, apparatus, and non-transitory computer-readable medium described herein, a sum of the restricted number of search candidates within the first TTI and the second TTI may be less than or equal to a threshold number of search candidates.

In some examples of the method, apparatus, and non-transitory computer-readable medium described herein, identifying the set of search candidates includes identifying a first subset of search candidates within the first TTI. Some examples of the method, apparatus, and non-transitory computer-readable medium described herein may further include processes, features, means, or instructions for identifying a second subset of search candidates within the second TTI, where the second subset of search candidates may be non-overlapping with the first TTI.

In some examples of the method, apparatus, and non-transitory computer-readable medium described herein, the second TTI may be a mini-slot including a time-shifted control resource set corresponding to the second subset of search candidates. In some examples of the method, apparatus, and non-transitory computer-readable medium described herein, the second TTI contains two or more mini-slots that each include a control resource set corresponding to the second subset of search candidates, a first mini-slot of the two or more mini-slots including a time-shifted control resource set that may be contiguous with a subsequent control resource set of a subsequent mini-slot.

Some examples of the method, apparatus, and non-transitory computer-readable medium described herein may further include processes, features, means, or instructions for identifying a time difference between the first downlink transmission and the second downlink transmission. Some examples of the method, apparatus, and non-transitory computer-readable medium described herein may further include processes, features, means, or instructions for transmitting an indication of the time difference to the first base station, the second base station, or a combination thereof.

In some examples of the method, apparatus, and non-transitory computer-readable medium described herein, the indication of the time difference may be transmitted via radio resource control (RRC) messaging, a medium access control (MAC) control element (CE), uplink control information, or a combination thereof. In some examples of the method, apparatus, and non-transitory computer-readable medium described herein, the second base station may have a non-ideal backhaul link with the first base station.

In some examples of the method, apparatus, and non-transitory computer-readable medium described herein, the first downlink transmission and the second downlink transmission may be asynchronous. In some examples of the method, apparatus, and non-transitory computer-readable medium described herein, the first communication link and the second communication link may be respective beam links with the UE.

A method of wireless communication is described. The method may include identifying that a UE is in communication with the first base station and a second base station, identifying that a first downlink transmission from the first base station to the UE and a second downlink transmission from the second base station to the UE will each be transmitted during respective TTIs that at least partially overlap, determining a control monitoring configuration for a number or timing of a set of search candidates based on the respective TTIs that at least partially overlap, and transmitting the first downlink transmission including the set of search candidates in accordance with the control monitoring configuration.

An apparatus for wireless communication is described. The apparatus may include means for identifying that a UE is in communication with the first base station and a second base station, means for identifying that a first downlink transmission from the first base station to the UE and a second downlink transmission from the second base station to the UE will each be transmitted during respective TTIs that at least partially overlap, means for determining a control monitoring configuration for a number or timing of a set of search candidates based on the respective TTIs that at least partially overlap, and means for transmitting the first downlink transmission including the set of search candidates in accordance with the control monitoring configuration.

Another apparatus for wireless communication is described. The apparatus may include a processor, memory in electronic communication with the processor, and instructions stored in the memory. The instructions may be operable to cause the processor to identify that a UE is in communication with the first base station and a second base station, identify that a first downlink transmission from the first base station to the UE and a second downlink transmission from the second base station to the UE will each be transmitted during respective TTIs that at least partially overlap, determine a control monitoring configuration for a number or timing of a set of search candidates based on the respective TTIs that at least partially overlap, and transmit the first downlink transmission including the set of search candidates in accordance with the control monitoring configuration.

A non-transitory computer-readable medium for wireless communication is described. The non-transitory computer-readable medium may include instructions operable to cause a processor to identify that a UE is in communication with the first base station and a second base station, identify that a first downlink transmission from the first base station to the UE and a second downlink transmission from the second base station to the UE will each be transmitted during respective TTIs that at least partially overlap, determine a control monitoring configuration for a number or timing of a set of search candidates based on the respective TTIs that at least partially overlap, and transmit the first downlink transmission including the set of search candidates in accordance with the control monitoring configuration.

In some examples of the method, apparatus, and non-transitory computer-readable medium described herein, determining the control monitoring configuration includes determining a restricted number of search candidates within a first TTI of the first downlink transmission with respect to non-overlapping TTIs transmitted by the first base station and the second base station.

In some examples of the method, apparatus, and non-transitory computer-readable medium described herein, a sum of the restricted number of search candidates within the first TTI and a number of search candidates of a second TTI of the second downlink transmission may be less than or equal to a threshold number of search candidates, where the first TTI and the second TTI at least partially overlap.

In some examples of the method, apparatus, and non-transitory computer-readable medium described herein, determining the control monitoring configuration includes determining a timing offset for the set of search candidates. Some examples of the method, apparatus, and non-transitory computer-readable medium described herein may further include processes, features, means, or instructions for applying the timing offset to the set of search candidates such that the set of search candidates may be non-overlapping with a TTI of the second downlink transmission.

Some examples of the method, apparatus, and non-transitory computer-readable medium described herein may further include processes, features, means, or instructions for transmitting the set of search candidates within two or more mini-slots that each include a control resource set corresponding to the set of search candidates, a first mini-slot of the two or more mini-slots including a time-shifted control resource set that may be contiguous with a subsequent control resource set of a subsequent mini-slot.

Some examples of the method, apparatus, and non-transitory computer-readable medium described herein may further include processes, features, means, or instructions for transmitting the set of search candidates within a mini-slot of the first downlink transmission, where the mini-slot includes a time-shifted control resource set corresponding to the set of search candidates.

Some examples of the method, apparatus, and non-transitory computer-readable medium described herein may further include processes, features, means, or instructions for receiving, from the UE, an indication of a time difference between downlink transmissions received at the UE, where the timing of the set of search candidates may be based on the time difference. In some examples of the method, apparatus, and non-transitory computer-readable medium described herein, the indication of the time difference may be received via RRC messaging, a MAC CE, uplink control information, or a combination thereof.

In some examples of the method, apparatus, and non-transitory computer-readable medium described herein, the second base station may have a non-ideal backhaul link with the first base station. In some examples of the method, apparatus, and non-transitory computer-readable medium described herein, the first downlink transmission and the second downlink transmission may be asynchronous.

A method of wireless communication is described. The method may include identifying a first uplink transmission using a first communication link with a first base station, the first uplink transmission to be sent on a carrier during a first TTI, identifying a second uplink transmission using a second communication link with a second base station, the second uplink transmission to be sent on the carrier during a second TTI, where the first TTI and the second TTI at least partially overlap, identifying an uplink power control mode by which the UE is to operate when communicating with the first base station and the second base station on the carrier, determining, based on the uplink power control mode, a first transmit power to apply to the first uplink transmission during the first TTI and a second transmit power to apply to the second uplink transmission during the second TTI, and transmitting the first uplink transmission using the first transmit power and transmitting the second uplink transmission using the second transmit power.

An apparatus for wireless communication is described. The apparatus may include means for identifying a first uplink transmission using a first communication link with a first base station, the first uplink transmission to be sent on a carrier during a first TTI, means for identifying a second uplink transmission using a second communication link with a second base station, the second uplink transmission to be sent on the carrier during a second TTI, where the first TTI and the second TTI at least partially overlap, means for identifying an uplink power control mode by which the UE is to operate when communicating with the first base station and the second base station on the carrier, means for determining, based on the uplink power control mode, a first transmit power to apply to the first uplink transmission during the first TTI and a second transmit power to apply to the second uplink transmission during the second TTI, and means for transmitting the first uplink transmission using the first transmit power and transmitting the second uplink transmission using the second transmit power.

Another apparatus for wireless communication is described. The apparatus may include a processor, memory in electronic communication with the processor, and instructions stored in the memory. The instructions may be operable to cause the processor to identify a first uplink transmission using a first communication link with a first base station, the first uplink transmission to be sent on a carrier during a first TTI, identify a second uplink transmission using a second communication link with a second base station, the second uplink transmission to be sent on the carrier during a second TTI, where the first TTI and the second TTI at least partially overlap, identify an uplink power control mode by which the UE is to operate when communicating with the first base station and the second base station on the carrier, determine, based on the uplink power control mode, a first transmit power to apply to the first uplink transmission during the first TTI and a second transmit power to apply to the second uplink transmission during the second TTI, and transmit the first uplink transmission using the first transmit power and transmitting the second uplink transmission using the second transmit power.

A non-transitory computer-readable medium for wireless communication is described. The non-transitory computer-readable medium may include instructions operable to cause a processor to identify a first uplink transmission using a first communication link with a first base station, the first uplink transmission to be sent on a carrier during a first TTI, identify a second uplink transmission using a second communication link with a second base station, the second uplink transmission to be sent on the carrier during a second TTI, where the first TTI and the second TTI at least partially overlap, identify an uplink power control mode by which the UE is to operate when communicating with the first base station and the second base station on the carrier, determine, based on the uplink power control mode, a first transmit power to apply to the first uplink transmission during the first TTI and a second transmit power to apply to the second uplink transmission during the second TTI, and transmit the first uplink transmission using the first transmit power and transmitting the second uplink transmission using the second transmit power.

Some examples of the method, apparatus, and non-transitory computer-readable medium described herein may further include processes, features, means, or instructions for identifying a minimum reserved transmit power and a maximum transmit power, where each of the first transmit power and the second transmit power may be equal to at least the minimum reserved transmit power. Some examples of the method, apparatus, and non-transitory computer-readable medium described herein may further include processes, features, means, or instructions for determining a remaining power based on a difference between the maximum transmit power and a sum of the first transmit power and the second transmit power, where the remaining power may be shared between the first uplink transmission and the second uplink transmission.

In some examples of the method, apparatus, and non-transitory computer-readable medium described herein, the remaining power may be shared between the first uplink transmission and the second uplink transmission based on a priority of the first communication link and a priority of the second communication link. In some examples of the method, apparatus, and non-transitory computer-readable medium described herein, the first uplink transmission and the second uplink transmission may be synchronous.

Some examples of the method, apparatus, and non-transitory computer-readable medium described herein may further include processes, features, means, or instructions for identifying a minimum reserved transmit power and a maximum transmit power, where each of the first transmit power and the second transmit power may be equal to at least the minimum reserved transmit power. Some examples of the method, apparatus, and non-transitory computer-readable medium described herein may further include processes, features, means, or instructions for determining a remaining power based on a difference between the maximum transmit power and a sum of the first transmit power and the second transmit power, the remaining power allocated to an uplink transmission that occurs temporally first.

In some examples of the method, apparatus, and non-transitory computer-readable medium described herein, the first uplink transmission and the second uplink transmission may be asynchronous. Some examples of the method, apparatus, and non-transitory computer-readable medium described herein may further include processes, features, means, or instructions for determining a capability of the UE to support the uplink power control mode. Some examples of the method, apparatus, and non-transitory computer-readable medium described herein may further include processes, features, means, or instructions for transmitting an indication of the determined capability to the first base station, the second base station, or a combination thereof.

Some examples of the method, apparatus, and non-transitory computer-readable medium described herein may further include processes, features, means, or instructions for determining a timing threshold associated with a capability of the UE to support the uplink power control mode. Some examples of the method, apparatus, and non-transitory computer-readable medium described herein may further include processes, features, means, or instructions for transmitting an indication of the timing threshold to the first base station, the second base station, or a combination thereof.

In some examples of the method, apparatus, and non-transitory computer-readable medium described herein, the first transmit power is based at least in part on a beam strength or a first beam index of the first communication link, and the second transmit power is based at least in part on a beam strength or a second beam index of the second communication link.

Some examples of the method, apparatus, and non-transitory computer-readable medium described herein may further include processes, features, means, or instructions for receiving an indication of the uplink power control mode from a base station, where the indication may be received via RRC messaging, a MAC CE, DCI, or a combination thereof. In some examples of the method, apparatus, and non-transitory computer-readable medium described herein, the second base station may have a non-ideal backhaul link with the first base station.

A method of wireless communication is described. The method may include identifying that a UE is in communication with the first base station and a second base station, where the first base station communicates with the UE on a first communication link on a carrier and the second base station communicates with the UE on a second communication link on the carrier, identifying that a first uplink transmission from the UE to the first base station and a second uplink transmission from the UE to the second base station will each be transmitted during respective TTIs that at least partially overlap, determining an uplink power control mode by which the UE is to operate when transmitting on the first communication link and the second communication link on the carrier, and transmitting an indication of the uplink power control mode to the UE.

An apparatus for wireless communication is described. The apparatus may include means for identifying that a UE is in communication with the first base station and a second base station, where the first base station communicates with the UE on a first communication link on a carrier and the second base station communicates with the UE on a second communication link on the carrier, means for identifying that a first uplink transmission from the UE to the first base station and a second uplink transmission from the UE to the second base station will each be transmitted during respective TTIs that at least partially overlap, means for determining an uplink power control mode by which the UE is to operate when transmitting on the first communication link and the second communication link on the carrier, and means for transmitting an indication of the uplink power control mode to the UE.

Another apparatus for wireless communication is described. The apparatus may include a processor, memory in electronic communication with the processor, and instructions stored in the memory. The instructions may be operable to cause the processor to identify that a UE is in communication with the first base station and a second base station, where the first base station communicates with the UE on a first communication link on a carrier and the second base station communicates with the UE on a second communication link on the carrier, identify that a first uplink transmission from the UE to the first base station and a second uplink transmission from the UE to the second base station will each be transmitted during respective TTIs that at least partially overlap, determine an uplink power control mode by which the UE is to operate when transmitting on the first communication link and the second communication link on the carrier, and transmit an indication of the uplink power control mode to the UE.

A non-transitory computer-readable medium for wireless communication is described. The non-transitory computer-readable medium may include instructions operable to cause a processor to identify that a UE is in communication with the first base station and a second base station, where the first base station communicates with the UE on a first communication link on a carrier and the second base station communicates with the UE on a second communication link on the carrier, identify that a first uplink transmission from the UE to the first base station and a second uplink transmission from the UE to the second base station will each be transmitted during respective TTIs that at least partially overlap, determine an uplink power control mode by which the UE is to operate when transmitting on the first communication link and the second communication link on the carrier, and transmit an indication of the uplink power control mode to the UE.

In some examples of the method, apparatus, and non-transitory computer-readable medium described herein, the uplink power control mode may be a minimum reserved transmit power applied to each of the first communication link and the second communication link. In some examples of the method, apparatus, and non-transitory computer-readable medium described herein, a remaining power that may be based on a difference between a maximum transmit power and a sum of transmit powers applied to each of the first communication link and the second communication link may be shared between the first communication link and the second communication link.

In some examples of the method, apparatus, and non-transitory computer-readable medium described herein, the remaining power may be shared between the first uplink transmission and the second uplink transmission based on a priority of the first communication link and a priority of the second communication link. In some examples of the method, apparatus, and non-transitory computer-readable medium described herein, the first uplink transmission and the second uplink transmission may be synchronous.

In some examples of the method, apparatus, and non-transitory computer-readable medium described herein, the uplink power control mode may be a minimum reserved transmit power applied to each of the first communication link and the second communication link. In some examples of the method, apparatus, and non-transitory computer-readable medium described herein, a remaining power that may be based on a difference between a maximum transmit power and a sum of transmit powers applied to each of the first communication link and the second communication link may be allocated to an uplink communication that occurs temporally first.

In some examples of the method, apparatus, and non-transitory computer-readable medium described herein, the first uplink transmission and the second uplink transmission may be asynchronous. Some examples of the method, apparatus, and non-transitory computer-readable medium described herein may further include processes, features, means, or instructions for receiving an indication of a capability of the UE to support the uplink power control mode. Some examples of the method, apparatus, and non-transitory computer-readable medium described herein may further include processes, features, means, or instructions for determining the uplink power control mode based on the capability.

Some examples of the method, apparatus, and non-transitory computer-readable medium described herein may further include processes, features, means, or instructions for receiving an indication of a timing threshold associated with a capability of the UE to support the uplink power control mode. Some examples of the method, apparatus, and non-transitory computer-readable medium described herein may further include processes, features, means, or instructions for determining the uplink power control mode based on the timing threshold.

In some examples of the method, apparatus, and non-transitory computer-readable medium described herein, transmitting the indication of the uplink power control mode includes transmitting the indication of the uplink power control mode via RRC messaging, a MAC CE, DCI, or a combination thereof.

BRIEF DESCRIPTION OF THE DRAWINGS

FIGS. 3A and 3B illustrate examples of control monitoring configurations in accordance with aspects of the present disclosure.

DETAILED DESCRIPTION

Figure 1:
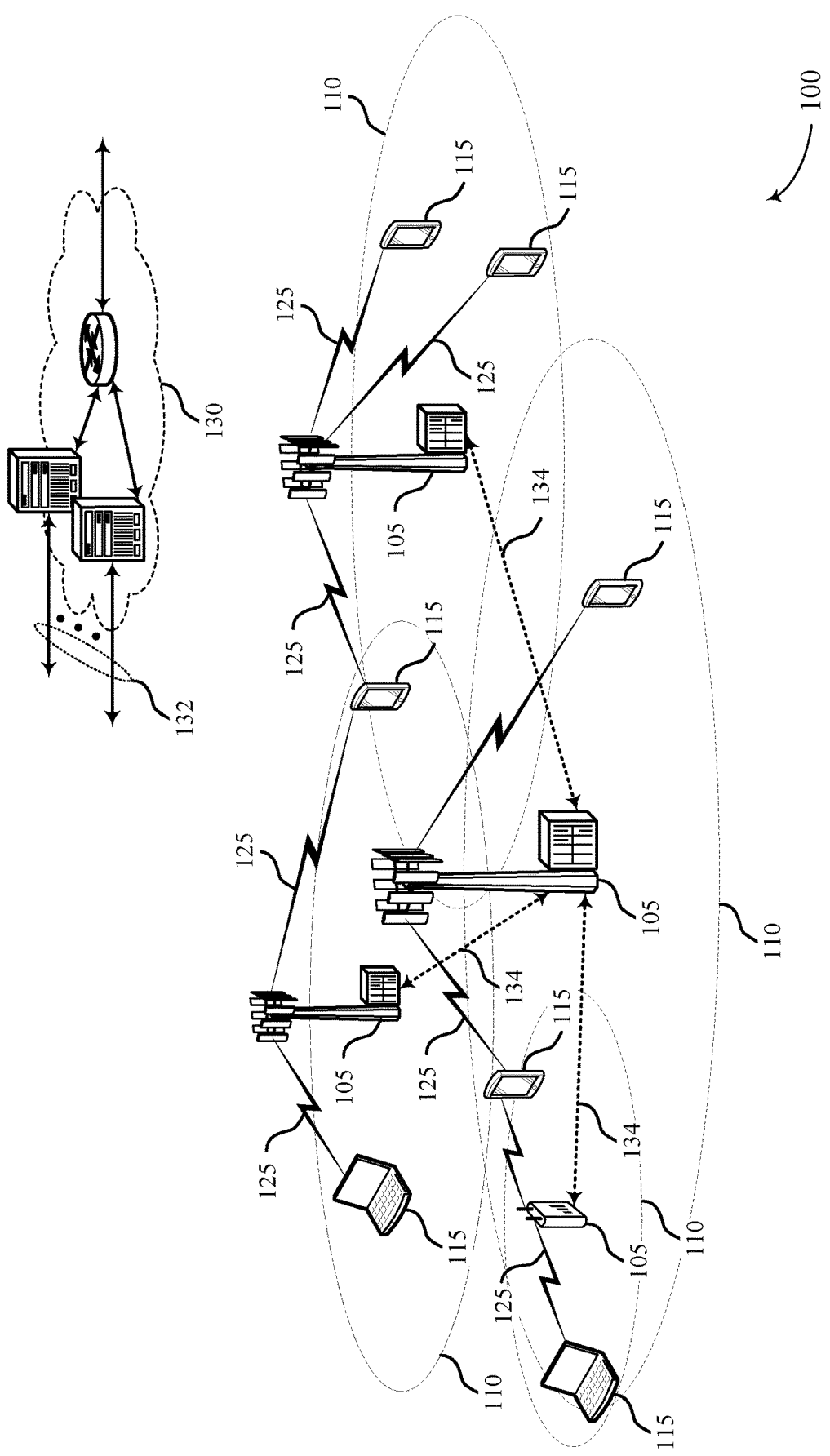
FIG. 1 illustrates an example of a wireless communications system in accordance with aspects of the present disclosure.

Some wireless communication systems may operate in frequency ranges that support beamformed transmissions between wireless devices. For example, communications in millimeter wave (mmW) frequency bands may experience increased signal attenuation (e.g., path loss). As a result, a number of signal processing techniques such as beamforming may be used to coherently combine energy and overcome the path losses in these systems. In such systems, a user equipment (UE) may be configured to monitor a physical downlink control channel (PDCCH) on multiple communication links. Communication links may refer to a pairing of a transmit beam (e.g., from a base station) and a receive beam (e.g., at a UE) (or vice versa) corresponding to a beam link pair, where an array of antennas form each beam at the respective device.

To decode relevant downlink control information (DCI), a UE may perform multiple blind decodes on a control region of a downlink transmission. Blind decoding may refer to a lack of a priori knowledge by the UE. That is, a UE performing a blind decode may have little knowledge of the information it is to receive and where any such information is located in time and frequency. Accordingly, blindly decoding portions of time and frequency resources may be intensive (e.g., computationally complex, energy consuming, etc.).

In some wireless deployments, a UE may communicate with multiple transmission/reception points (TRPs). For instance, the UE may use different radio frequency (RF) chains to communicate with different base stations using beamformed transmissions, where each base station may transmit its own signals including control information and/or data (e.g., the signals may be sent using PDCCH and physical downlink shared channel (PDSCH)). Directional transmissions to and from such TRPs may be sent using respective communication links on the same carrier or RF band. Additionally, these multi-link (or multi-TRP) deployments may include backhaul links between the various TRPs, where the TRPs may coordinate communications with the same UE.

However, in some multi-TRP deployments, respective TRPs may lack an ideal backhaul link, which may impact coordination of DCI transmitted by each TRP. While these TRPs may be able to employ radio resource control (RRC)-level coordination, the TRP's inability to coordinate transmissions may affect the UE's ability to efficiently obtain control information, which may negatively impact communications with the different TRPs.

Techniques described herein provide for control channel monitoring and power control that a wireless device may use to efficiently communicate with different TRPs having a non-ideal backhaul. For example, control monitoring may be configured such that a maximum number of decoding candidates is not exceeded when the UE attempts blind decoding. In such cases, a UE may employ a candidate restriction, where certain overlapping transmission time intervals (TTIs) may include a limited number of decoding candidates (e.g., a sum of the decoding candidates in each TTI may not exceed a threshold). Additionally or alternatively, a TTI (e.g., a mini-slot) may be configured to include a time-shifted control resource set so that a set of search candidates may not overlap between TTIs associated with transmissions from different TRPs. The UE may also utilize different power control modes for uplink transmissions on respective communication links with multiple TRPs. For example, the UE may allocate up to a minimum guaranteed power for each of two or more communication links, and any remaining power may be shared across the different links. In other examples, the remaining power may be made available to the transmission (and the corresponding link) that starts earliest in time.

Aspects of the disclosure are initially described in the context of a wireless communications system. Further examples are then provided that illustrate control monitoring configurations for overlapping TTIs associated with respective communication links. Aspects of the disclosure are further illustrated by and described with reference to apparatus diagrams, system diagrams, and flowcharts that relate to control monitoring and power control for multi-link deployments.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 25 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

A physical downlink control channel (PDCCH) carries downlink control information (DCI) in control channel elements (CCEs), which may consist of nine logically contiguous resource element groups (REGs), where each REG contains four resource elements (REs). DCI includes information regarding downlink scheduling assignments, uplink resource grants, transmission schemes, uplink power control, HARQ information, MCS, and other information. The size and format of the DCI messages may differ depending on the type and amount of information that is carried by the DCI. For example, if spatial multiplexing is supported, the size of the DCI message may be large compared to contiguous frequency allocations. Similarly, for a system that employs MIMO, the DCI may include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a cell radio network temporary identifier (C-RNTI), and cyclic redundancy check (CRC) bits attached to each DCI may be scrambled based on the C-RNTI. To reduce power consumption and overhead at the UE 115, a limited set of CCE locations may be specified for DCI associated with a specific UE 115. CCEs may be grouped (e.g., in groups of 1, 2, 4 and 8 CCEs), and a set of CCE locations in which the UE 115 may find relevant DCI may be specified. That is, a control resource set (e.g., a CORE-SET) may be located in the set of CCE locations. These CCEs may be known as a search space.

The search space can be partitioned into two regions: a common CCE region or search space and a UE-specific (dedicated) CCE region or search space. The common CCE region may be monitored by all UEs 115 served by a base station 105 and may include information such as paging information, system information, information related to random access procedures, and the like. The UE-specific search space may include user-specific control information. In some cases, CCEs may be indexed, and the common search space may, for example, start from CCE 0. The starting index for a UE-specific search space may depend on the C-RNTI, the subframe index, the CCE aggregation level, and a random seed. A UE 115 may attempt to decode DCI by performing a process known as a blind decode, during which search spaces (e.g., containing a set of search candidates) are randomly decoded until the DCI is detected. During a blind decode, the UE 115 may attempt descramble all potential DCI messages using its C-RNTI, and perform a CRC check to determine whether the attempt was successful.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. For example, a mini-slot may include between 1 and 13 orthogonal frequency-division multiplexing (OFDM) symbols, and may be configured to be a certain number of symbols (e.g., 2, 4, or 7 symbols). In some instances, a symbol of a mini-slot or a mini-slot may be the smallest unit of scheduling. Each symbol may vary in duration depending on the subcarrier spacing or frequency band of operation, for example. In some examples, resources used for the transmission of control information within a mini-slot may be found at any location within the mini-slot. For instance, a control region carrying DCI may not necessarily begin at a temporally first symbol of a mini-slot, and may instead start at a later symbol period (e.g., be shifted in time within the mini-slot). Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link 134). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 megahertz (MHz), etc.) at reduced symbol durations (e.g., 16.67 microseconds (µs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a UE 115 may be served by cells from two or more TRPs or base stations 105 that are connected by a non-ideal backhaul link 134 in dual connectivity operation. For example, a connection between a serving base station 105 and the UE 115 may not be sufficient to facilitate precise timing coordination. Thus, in some cases, the cells serving a UE 115 may be divided into multiple timing advance groups (TAGs). Each TAG may be associated with a different timing offset, such that the UE 115 may synchronize uplink transmissions differently for different uplink carriers. By contrast, and as described herein, a UE 115 may also be served by two or more TRPs or base stations 105 where the UE 115 and base stations 105 communicate on a same carrier using respective communication links 125 with each base station 105. For instance, the UE 115 may operate using directional or beamformed transmissions, and the beamformed transmissions to different base stations 105 may enable simultaneous (or near simultaneous) transmissions on a same carrier or RF band, where respective transmissions are sent in different directions on a beam link pair.

Wireless communications system 100 may support control resource set monitoring and uplink power control techniques that enhance communications efficiency when communicating with multiple TRPs. For example, a UE 115 may be in communication with two or more base stations 105 at the same time, where uplink and downlink transmission on a carrier may be sent on respective communication links 125 (e.g., beam link pairs) with each base station 105. Additionally, a backhaul link 134 between the base stations 105 may not be ideal (e.g., DCI coordination may be limited). As a result, transmissions on the communication links 125 may be synchronous or asynchronous, where TTIs of transmissions to or from the respective base stations 105 may at least partially overlap.

In some cases, a UE 115 may identify a set of search candidates for DCI in overlapping TTIs associated with downlink transmissions from respective base stations 105, where a configuration of a number or timing of the set of search candidates is based on the overlapping TTIs. For example, different overlapping TTIs may have a restricted number of search candidates in each TTI, with respect to non-overlapping TTIs. Additionally or alternatively, the search candidates may be time-shifted in one of the overlapping TTIs such that a set of control resources in a first TTI associated with a first base station 105 may not overlap with (or may be orthogonal in time to) a second TTI associated with a second base station 105.

The UE 115 may also use different transmit power modes for uplink communications on the communication links 125. For example, a base station 105 may configure a power control mode for the UE 115 to use with uplink transmissions to different base stations 105. The power control mode may include a minimum reserved power that may be split between different communication links 125, and an additional (or a remaining transmit power, for example, up to a maximum total transmit power) may be split between the communication links 125. In some examples, the remaining power may be applied to the uplink transmission (and the corresponding communication link 125) that occurs temporally first. In further examples, the UE may determine that a delay between two or more communication links (e.g., a delay in receiving DCI and transmitting an uplink transmission) is less than a threshold, and may use the minimum guaranteed power for the two or more communication links. Additionally or alternatively, the UE may determine that a delay between the two or more communication links is greater than a threshold, and may determine a different power control mode (e.g., based on a ratio of timing information between the DCI and the uplink transmission).

Figure 2:
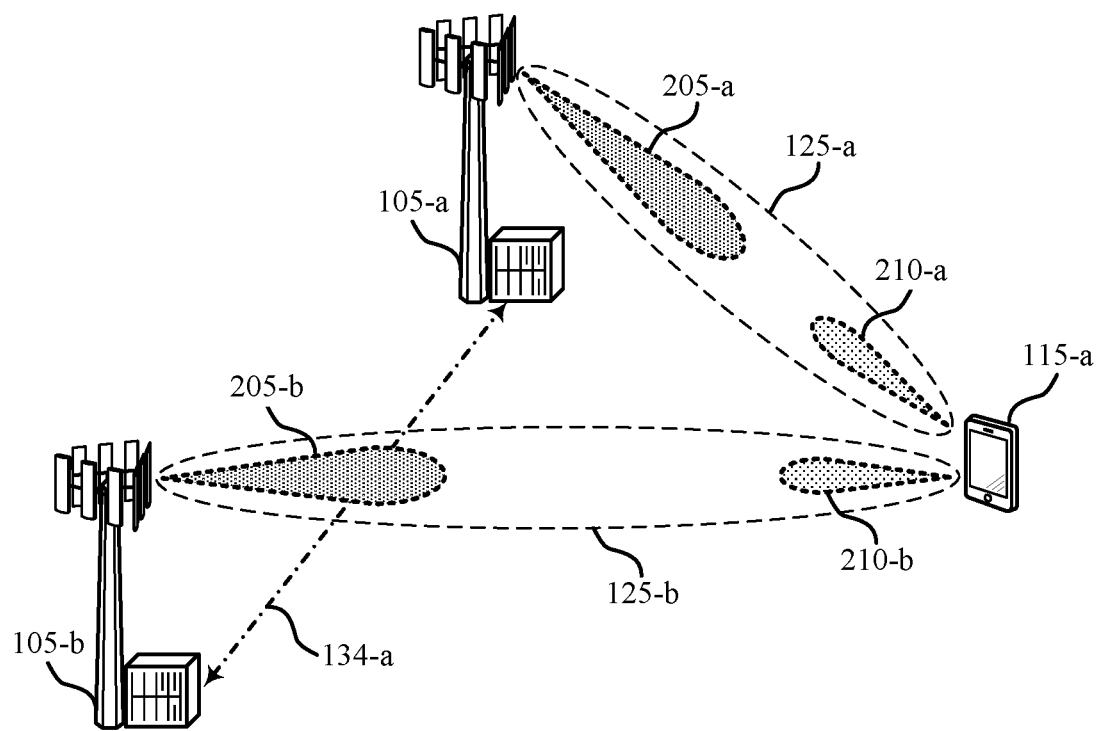
FIG. 2 illustrates an example of a wireless communications system in accordance with aspects of the present disclosure.

FIG. 2 illustrates an example of a wireless communications system 200 that supports various aspects of the present disclosure. In some examples, wireless communications system 200 may implement aspects of wireless communications system 100. For example, wireless communications system 200 includes a UE 115-a and one or more TRPs (e.g., a first base station 105-a and a second base station 105-b), which may be examples of the corresponding devices described with reference to FIG. 1. Wireless communications system 200 may support control resource monitoring and uplink transmit power techniques that enable efficient communications with multiple TRPs over respective communication links 125.

Wireless communications system 200 may operate in frequency ranges that are associated with beamformed transmissions between base station 105-a and UE 115-a and between base station 105-b and UE 115-a. For example, wireless communications system 200 may operate using mmW frequency ranges (e.g., 28 GHz, 40 GHz, 60 GHz, etc.), which may be associated with increased signal attenuation (e.g., path loss), and may be affected by various factors, such as temperature, barometric pressure, humidity, diffraction, etc. As a result, wireless communications system 200 may use a number of signal processing techniques such as beamforming to combine energy coherently and overcome path loss.

By way of example, base station 105-a may contain multiple antennas. In some cases, each antenna may transmit a phase-shifted version of a signal such that the phase-shifted versions constructively interfere in certain regions and destructively interfere in other regions. The various phase-shifted versions may be weighted, for example, to steer the transmissions in a desired direction. Such techniques (or similar techniques) may serve to increase the coverage area of base station 105-a or base station 105-b or to otherwise benefit wireless communications system 200.

As illustrated by wireless communications system 200, UE 115-a may communicate with multiple TRPs using respective communication links 125, which may also be referred to as beam link pairs, or similar terminology. Each communication link 125 may include a transmit beam 205 and a corresponding receive beam 210. For instance, UE 115-a may communicate with first base station 105-a using a first communication link 125-a, where downlink transmissions may be sent by first base station 105-a using transmit beam 205-a and received at UE 115-a using receive beam 210-a. Likewise, UE 115-a may communicate with second base station 105-b using a second communication link 125-b, which similarly include a transmit beam 205-b and a receive beam 210-b. The base station 105 may direct each transmit beam 205 toward a different region of a coverage area and, in some cases, two or more beams may overlap. Multiple transmit beams 205 may be transmitted simultaneously or at different times. In either case, UE 115-a may be capable of receiving one or more transmit beams 205 (e.g., from the same or from different base stations 105) via respective receive beams 210-a and 210-b. Additionally, the base stations 105 and UE 115-a may send transmissions on a same carrier or frequency, where mutual interference due to the directionality of the transmissions may not affect the transmissions (and thus may not require the use of different carriers for synchronous and asynchronous transmissions).

Although transmit beams 205 at each base station 105 (and the associated receive beams 210 at UE 115-a) are described, it is understood that similar beams for transmissions from UE 115-a to base stations 105-a and 105-b may also be used for uplink communications. That is, UE 115-a may use respective transmit beams for transmissions to first base station 105-a and second base station 105-b, while each base station 105 may form a corresponding receive beam to receive the uplink transmissions. Additionally, while the present example is described using two TRPs, the techniques described herein may be extended to any suitable number of TRPs and/or communication links (three, four, etc.).

In wireless communications system 200, a backhaul link 134-a (e.g., an intermediate link where S1 and X2 interfaces are implemented) may couple different TRPs. For instance, first base station 105-a and second base station 105-b may communicate with each other using backhaul link 134-a. While not shown, one or both of base stations 105-a and 105-b may have an additional backhaul link to a core network, or to other TRPs, such as described herein with reference to FIG. 1. In some cases, backhaul link 134-a may be non-ideal, and may hinder the coordination of communications with first base station 105-a and second base station 105-b. An ideal backhaul link may be defined as a backhaul link 134-a having a certain amount of latency (e.g., less than 2.5 μs) and throughput (e.g., up to 10 Gbps). Thus, a non-ideal backhaul link may be any backhaul link that does not meet the ideal backhaul categorization.

First base station 105-a and second base station 105-b may each send its own signaling, including PDCCH and PDSCH, to UE 115-a. These transmissions may be synchronous or asynchronous (which may be defined by a timing between the base stations 105 or with respect to a timing threshold (e.g., greater than or less than a certain value, such as 30 μs)). For example, first base station 105-a and second base station 105-b may rely on global positioning system (GPS) timing to achieve some level of synchronicity, or may both have a similar or same frame boundary (within a few μs offset). Accordingly, UE 115-a may monitor for and decode DCI transmissions from each base station 105 to communicate with the respective base stations 105.

However, due to the non-ideal backhaul link 134-a, maintaining a close level of coordination for DCI between first base station 105-a and second base station 105-b may be difficult. Additionally, while RRC-level coordination may be possible between first base station 105-a and second base station 105-b, the inability of these TRPs to coordinate transmissions may introduce additional complexities when UE 115-a attempts to perform blind decoding and may impact communications efficiency. For example, there may be TTIs associated with transmissions by the different base station 105 that may at least partially overlap. In such cases, UE 115-a may attempt to monitor search candidates from each base station 105 for blind decoding during the overlapping TTIs. However, UE 115-a may be limited by a threshold number of blind decodes during a given TTI, and multiple search candidates from different TRPs within overlapping TTIs on the same carrier may exceed the threshold number of blind decodes.

As a result, control channel monitoring techniques may be used to enable efficient communications with different TRPs having non-ideal backhaul links 134-a. For example, a downlink control monitoring design may be configured such that a maximum number of decoding candidates is not exceeded when UE 115-a attempts blind decoding. In such cases, a candidate restriction may be used, where overlapping TTIs may include a limited number of decoding candidates and a sum of the decoding candidates in overlapping TTIs may not exceed the threshold number of blind decodes. Additionally or alternatively, a TTI from first base station 105-a (or from second base station 105-b) may include a time-shifted control resource set that prevents search candidates from overlapping between TTIs of different TRPs. For example, a control resource set of first base station 105-a during a first TTI may be orthogonal in time with a control resource set of second base station 105-b during a second TTI, where the first and second TTI may overlap in time on a same carrier or RF band.

UE 115-a may also utilize different power control modes (PCMs) for uplink transmissions on respective communication links 125. That is, the UE 115-a may apply power control to communication links 125-a and 125-b at the same frequency (on the same carrier). For example, there may be at least two power control modes defined for multi-link transmissions, and different power control modes may be used for synchronous and asynchronous TRPs. As an example of a first power control mode (e.g., PCM 1), UE 115-a may allocate up to a minimum guaranteed power to each communication link 125, and any remaining power may be shared across first communication link 125-a and second communication link 125-b. In some cases, UE 115-a may use PCM 1 when first base station 105-a and second base station 105-b have synchronous transmissions, however UE 115-a may also use PCM 1 with asynchronous transmissions. In some examples, the remaining power may be calculated from a difference between a maximum allowed transmit power and a sum of the power allocated to first communication link 125-a and second communication link 125-b.

A priority order may determine the way in which the remaining power is shared among the communication links 125. For example, the priority order may be based on a type of uplink control information sent on each communication link 125 (e.g., HARQ feedback, SR, etc.), or may be based on a priority of each communication link 125. For instance, first communication link 125-a may be a serving link (e.g., first base station 105-a may be a serving base station 105) whereas second communication link may be a secondary link (e.g., second base station 105-b may be a secondary or other base station 105). UE 115-a may prioritize transmission power allocations accordingly for first communication link 125-a based on its association with the serving link. Other priority orders of transmissions and communication links 125 not described herein may also be used when allocating the remaining power.

In an example of a second power control mode (e.g., PCM 2), UE 115-a may reserve (up to) the minimum guaranteed power for each communication link 125, and any remaining power may be first made available to a transmission on one of the communication links 125 that occurs first (the earliest in time). In some cases, UE 115-a may use PCM 2 with asynchronous communications (e.g., where a timing difference between transmissions is greater than a threshold corresponding to the capabilities of UE 115-a). PCM 2 may also be configured based on a capability of UE 115-a. For example, UE 115-a may determine its capabilities and provide an indication of such capabilities to first base station 105-a (or to second base station 105-b). The capabilities of UE 115-a may be associated with how quickly UE 115-a may receive a resource grant, decode a control channel (such as PDCCH), and be ready to send an uplink transmission. For instance, UE 115-a may have a capability to decide on an uplink power for a communication link 125 one or two symbols before an uplink transmission is to begin. In other cases, UE 115-a may have a capability to prepare for uplink transmission much sooner (e.g., one or more slots in advance). Accordingly, first base station 105-a may determine which power control mode (e.g., PCM 1, PCM 2, or another power control mode for multi-link transmissions) that UE 115-a is to use based on the reported capabilities. In further cases, the power control mode may be a based on a beam strength or beam index associated with associated transmissions. For instance, UE 115-a may measure a beam strength or identify a beam index associated with a particular beam, and may select a PCM based on the measured strength or index.

In some cases, UE 115-a may also specify a timing threshold for which UE 115-a may support various power control modes. For example, UE 115-a may identify the threshold at which it may be capable of supporting PCM 2, and may report that threshold to first base station 105-a, second base station 105-b, or to both. Additionally or alternatively, UE 115-*a* may identify a timing difference between respective transmissions from first base station 105-*a* and second base station 105-*b*, and report the timing difference. The power control mode configured for UE 115-*a* may be based on the timing difference. In some cases, the signaling of the power control mode may be transmitted to UE 115-*a* via RRC messaging, a MAC CE, DCI, or other signaling techniques.

FIGS. 3A and 3B illustrate examples of control monitoring configurations 301 and 302 in accordance with various aspects of the present disclosure. Control monitoring configurations 301 and 302 may be examples of different schemes used by a UE 115 when monitoring for search candidates (e.g., to perform blind decoding of DCI). For instance, control monitoring configuration 301 may illustrate an example of a candidate restriction such that the UE 115 refrains from exceeding a blind decoding threshold for overlapping TTIs. Additionally, control monitoring configuration 302 may be an example of a time-shifted control resource set that does not overlap with another TTI associated with a transmission by a different TRP (e.g., a base station 105).

Control monitoring configurations 301 and 302 may illustrate downlink transmissions 305 sent by respective TRPs (e.g., base stations 105). As described with reference to FIG. 2, TRPs may send the downlink transmissions 305 to a UE 115 on respective communication links, where the TRPs may operate synchronously or asynchronously. Accordingly, within the different downlink transmissions 305 there may be TTIs 310 that overlap with one another. Each TTI 310 may be an example of a slot, but TTIs 310 of different durations may be possible. As shown in control monitoring configuration 301, a first downlink transmission 305-*a* (e.g., from a first TRP (TRP 1)) may include multiple TTIs 310, and a TRP may recognize that one or more TTIs 310 may overlap with the downlink transmissions of another TRP.

As an example, a first TTI 310-*a* of the first downlink transmission 305-*a* may overlap in time with a second TTI 310-*b* of a second downlink transmission 305-*b* from a second, different, TRP (TRP 2) on a same carrier. Additionally, each TTI 310 may include a set of search candidates 315 that the UE 115 may use for blind decoding of DCI from the respective TRPs (such as when there is time division multiplexed (TDM) monitoring of CORESETS from each TRP). When attempting to locate control information within the overlapping TTIs 310-*a* and 310-*b*, the UE 115 may be limited by a threshold number of blind decodes. That is, the UE 115 may not attempt more than a certain number of blind decodes on a set of search candidates 315 during the first TTI 310-*a*, despite multiple sets of search candidates 315-*a* and 315-*b* associated with respective TRPs both being within a boundary or duration of first TTI 310-*a*.

As a result, a TRP may identify the overlapping transmissions for the UE 115, and may configure a candidate restriction for control monitoring configuration 301. In such cases, each set of search candidates 315-*a* and 315-*b* may be restricted with respect to other search candidates 315 in non-overlapping TTIs 310. That is, a sum of search candidates 315-*a* and 315-*b* may not exceed the blind decode threshold. Such candidate restriction may ensure that the total number of blind decodes performed by the UE 115 does not satisfy the threshold, and enables the UE 115 to refrain from unnecessarily attempting a blind decode on a large number of search candidates 315 during first TTI 310-*a*.

Additionally or alternatively, and as illustrated in control monitoring configuration 302, a time offset may be applied to a set of search candidates 315 for TTIs 310 that at least partially overlap. For example, a first TTI 310-*c* within a first downlink transmission 305-*c* (e.g., from a first base station 105 or TRP) may overlap with a second TTI 310-*d* of a second downlink transmission 305-*d* (e.g., from a second base station 105 or TRP). Each TTI 310 may include a set of search candidates 315, but a base station 105 may configure the second TTI 310-*d* such that a subset of search candidates 315-*d* is orthogonal in time with the first TTI 310-*c*. In other words, the time offset may be applied to the control resource set corresponding to the subset of search candidates 315-*d* so that the subset of search candidates 315-*d* is non-overlapping with first TTI 310-*c*.

In configuring the timing offset of the subset of search candidates 315-*d* shown in control monitoring configuration 302, a base station 105 may configure the second TTI 310-*d* as, for example, a mini-slot. A control position of a mini-slot may begin at any symbol and a mini-slot may be up to 13 symbols long. In some cases, the use of the mini-slot may result in one symbol being dropped between TTI 310-*d* and a subsequent TTI 310. As illustrated, second TTI 310-*d* may be an example of a single 13-symbol mini-slot, but one or more mini-slots of other durations may be configured for TTI 310-*d* and the corresponding time-shift of search candidates 315-*d*. For example, second TTI 310-*d* may comprise two seven-symbol mini-slots, and the control resource set in a temporally first mini-slot may be time shifted. Additionally, the time-shifted control resource set in the temporally first mini-slot may be contiguous with a control resource set in a subsequent mini-slot. For instance, a control resource set in a first mini-slot may occupy the sixth and seventh symbols, where another control resource set may occupy the first symbol of a second mini-slot that immediately follows the first mini-slot. However, other configurations for the control resource sets (and corresponding search candidates 315-*d*) within one or more mini-slots may be possible.

In some cases, the offset and a mini-slot configuration may be based on time difference feedback by the UE 115. For instance, the UE 115 may identify time difference 325 between downlink transmissions 305 sent by respective TRPs. The UE 115 may identify the time difference using one or more synchronization signal (SS) blocks acquired from the respective TRPs. In such cases, an SS block may be quasi co-located (QCL) with a reference signal (e.g., CSI-RS) transmitted by the TRP (which may also be associated with a PDCCH DM-RS). Based on the acquisition of the SS block, the UE 115 may determine the timing of downlink transmissions 305 associated with each TRP. In turn, the UE 115 may transmit an indication of the time difference 325 to a base station 105, and the time-offset applied to search candidates 315-*d* in the second TTI 310-*d* may be based on the reported time difference 325. In other examples, the UE 115 may send an indication of its preferred mini-slot configuration, which may be based on the identified time difference 325 or other factors. The UE 115 may transmit the feedback of the time difference 325 (or the preferred mini-slot configuration) using RRC signaling, a MAC CE, UCI, or other signaling methods.

Figure 4:
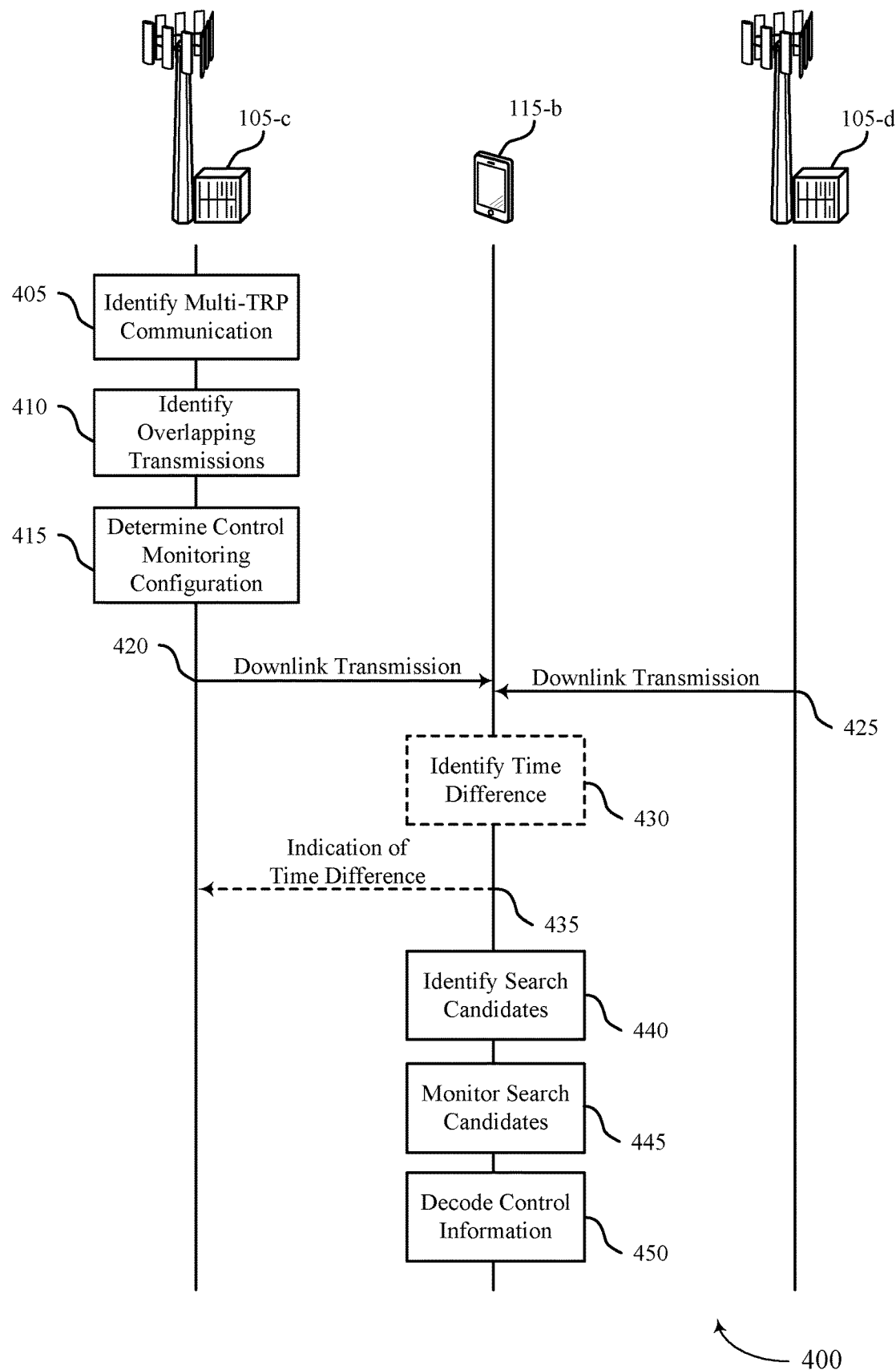
FIGS. 4 and 5 illustrate examples of process flows in accordance with aspects of the present disclosure.

FIG. 4 illustrates an example of a process flow 400 in accordance with various aspects of the present disclosure. In some examples, process flow 400 may implement aspects of wireless communications system 100. For example, process flow 400 includes a first base station 105-*c*, second base station 105-*d*, and UE 115-*b*, which may be examples of the corresponding devices described with reference to FIG. 1. Process flow 400 may illustrate the use of control monitoring techniques in a multi-link deployment.

At 405, first base station 105-*c* may determine that UE 115-*b* is communicating with multiple base stations 105 in a multi-link (or multi-TRP) deployment. For instance, first base station 105-*c* may identify that UE 115-*b* is in communication with first base station 105-*c* and second base station 105-*d*. As a result, at 410, first base station 105-*c* may identify that a first downlink transmission from first base station 105-*c* to UE 115-*b* and a second downlink transmission from second base station 105-*d* to UE 115-*b* will each be transmitted during respective TTIs that at least partially overlap in time. In some examples, second base station 105-*d* may have a non-ideal backhaul link with first base station 105-*c*, which may result in limited DCI coordination between first base station 105-*c* and second base station 105-*d*.

At 415, first base station 105-*c* may determine a control monitoring configuration for a number or timing of a set of search candidates based on the respective TTIs that at least partially overlap. For instance, first base station 105-*c* may determine a restricted number of search candidates within a first TTI of the first downlink transmission with respect to non-overlapping TTIs transmitted by first base station 105-*c* and second base station 105-*d*. In such cases, a sum of the restricted number of search candidates within the first TTI and a number of search candidates of a second TTI of the second downlink transmission is less than or equal to a threshold number of search candidates. Additionally or alternatively, first base station 105-*c* may determine a timing offset for the set of search candidates, where the timing offset may be later applied to a set of search candidates such that the set of search candidates do not overlap with a TTI of the second downlink transmission.

At 420, first base station 105-*c* may transmit, and UE 115-*b* may receive, a first downlink transmission from via the first communication link, the first downlink transmission received on the carrier during the TTI. Additionally, at 425, second base station 105-*d* may transmit, and UE 115-*b* may receive, a second downlink transmission from second base station 105-*d* via the second communication link, the second downlink transmission received on the carrier during a second TTI, where the first TTI and the second TTI at least partially overlap. In some cases, the first downlink transmission and the second downlink transmission may be asynchronous (e.g., based on a timing threshold).

At 430, UE 115-*b* may optionally identify a time difference between the first downlink transmission and the second downlink transmission. Subsequently, at 435, UE 115-*b* may optionally transmit (e.g., to either first base station 105-*c* or second base station 105-*d*, or both) an indication of the time difference. In such cases, the control monitoring configuration may be based on the indicated time difference. In some examples, UE 115-*b* may transmit the indication of the time difference via RRC messaging, a MAC CE, UCI, or a combination thereof.

At 440, UE 115-*b* may identify a set of search candidates within the first TTI and within the second TTI, where a number or timing of the set of search candidates is based on the first TTI and the second TTI partially overlapping. UE 115-*b* may accordingly identify a restricted number of search candidates within each of the first TTI and the second TTI with respect to non-overlapping TTIs received by UE 115-*b* from first base station 105-*c* and second base station 105-*d*. Additionally or alternatively, UE 115-*b* may identify a first subset of search candidates within the first TTI and identify a second subset of search candidates within the second TTI, where the second subset of search candidates is non-overlapping with the first TTI. In such cases, the second TTI may include a mini-slot including a time-shifted control resource set corresponding to the second subset of search candidates. In other examples, the second TTI includes two or more mini-slots that each include a control resource set corresponding to the second subset of search candidates, a first mini-slot of the two or more mini-slots including a time-shifted control resource set that is contiguous with a subsequent control resource set of a subsequent mini-slot.

At 445, UE 115-*b* may monitor the set of search candidates for respective control information from the first base station 105-*c* and second base station 105-*d*. At 450, UE 115-*b* may decode DCI received from first base station 105-*c* or from second base station 105-*d* (or both) based on the monitoring of the search candidates and an associated blind decoding.

Figure 5:
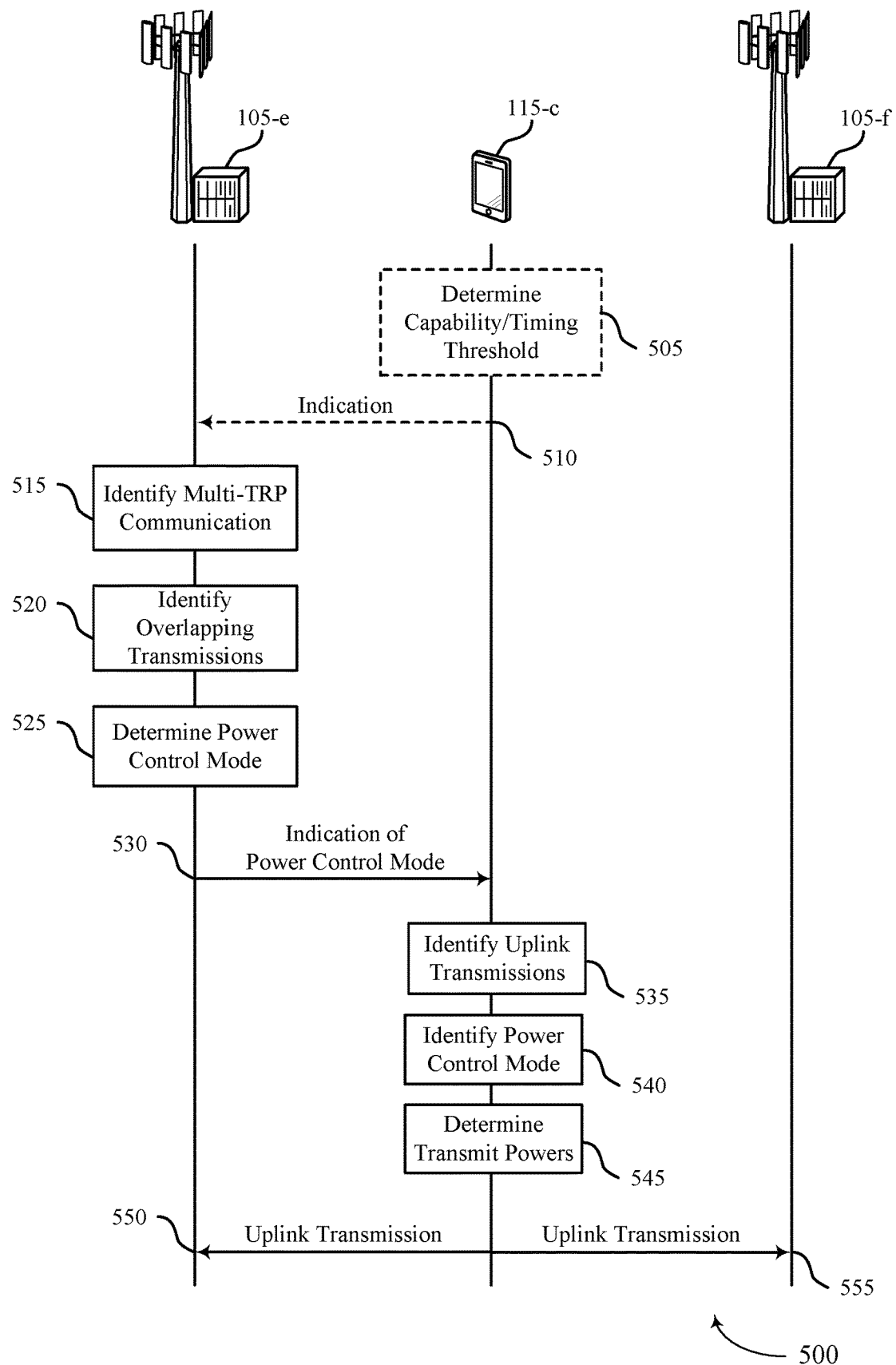

FIG. 5 illustrates an example of a process flow 500 in accordance with various aspects of the present disclosure. In some examples, process flow 500 may implement aspects of wireless communications system 100. For example, process flow 500 includes a first base station 105-*e*, second base station 105-*f*, and UE 115-*c*, which may be examples of the corresponding devices described with reference to FIG. 1. Process flow 400 may illustrate the use of power control techniques in a multi-link deployment.

At 505, UE 115-*c* may optionally determine a capability to support different uplink power control modes. For example, UE 115-*c* may identify a timing threshold that corresponds to how early UE 115-*c* may prepare an uplink transmission after receiving a resource grant. In such cases, at 510, UE 115-*c* may optionally transmit an indication of the capability (or the timing threshold) to first base station 105-*e*, second base station 105-*f*, or a combination thereof.

At 515, first base station 105-*e* may determine that UE 115-*c* is communicating with multiple base stations 105 in a multi-link (or multi-TRP) deployment. For example, first base station 105-*e* may identify that UE 115-*c* is in communication with first base station 105-*e* and second base station 105-*f*, where first base station 105-*e* communicates with UE 115-*c* on a first communication link on a carrier and second base station 105-*f* communicates with UE 115-*c* on a second communication link on the same carrier. In some examples, first base station 105-*e* and second base station 105-*f* may be synchronous or asynchronous (e.g., based on a timing threshold).

At 520, first base station 105-*e* may identify that a first uplink transmission from UE 115-*c* to first base station 105-*e* and a second uplink transmission from UE 115-*c* to second base station 105-*f* will each be transmitted during respective TTIs that at least partially overlap. For example, based on the multi-TRP deployment identified, first base station 105-*e* may determine whether transmissions by the respective base stations 105 may be synchronous or asynchronous, and may determine if TTIs of respective transmissions overlap in time.

At 525, first base station 105-*e* may determine an uplink power control mode by which UE 115-*c* is to operate when transmitting on the first communication link and the second communication link on the carrier. For example, the uplink power control mode may include at least a minimum reserved transmit power applied to each of the first communication link and the second communication link, where a remaining power is shared between the first and second communication link (e.g., in accordance with PCM 1, as described above). Additionally or alternatively, the remaining power may be applied to the transmission (and the associated communication link) that occurs temporally first (e.g., in accordance with PCM 2, as described above). In some cases, the power control mode may be based on the timing threshold or capability indicated by UE 115-c (e.g., at 510).

At 530, first base station 105-e may transmit, and UE 115-c may receive, an indication of the power control mode. In some cases, first base station 105-e may transmit the indication of the uplink power control mode via RRC messaging, a MAC CE, DCI, or a combination thereof.

At 535, UE 115-c may identify the first uplink transmission using the first communication link with first base station 105-e, the first uplink transmission to be sent on a carrier during a first TTI. UE 115-c may also identify a second uplink transmission using the second communication link with second base station 105-f, the second uplink transmission to be sent on the carrier during a second TTI, where the first TTI and the second TTI at least partially overlap.

At 540, UE 115-c may identify the uplink power control mode by which UE 115-c is to operate when communicating with first base station 105-e and second base station 105-f on the carrier (e.g., based on the received indication of the power control mode). For instance, UE 115-c may identify PCM 1 or PCM 2 for transmissions on different communication links, as described with reference to FIG. 2.

At 545, UE 115-c may determine, based on the uplink power control mode, a first transmit power to apply to the first uplink transmission during the first TTI and a second transmit power to apply to the second uplink transmission during the second TTI. In some examples, UE 115-c may identify a minimum reserved transmit power and a maximum transmit power, where each of the first transmit power and the second transmit power are equal to at least the minimum reserved transmit power. UE 115-c may then determine a remaining power based on a difference between the maximum transmit power and a sum of the first transmit power and the second transmit power, where the remaining power is shared between the first uplink transmission and the second uplink transmission. The remaining power may be shared between the first uplink transmission and the second uplink transmission based on a priority of the first communication link and a priority of the second communication link, which may be used in cases of synchronous communications by first base station 105-e and second base station 105-f. In other examples, the remaining power may be allocated to an uplink transmission that occurs temporally first, which may be used in cases of asynchronous communications by first base station 105-e and second base station 105-f.

At 550 and at 555, UE 115-c may transmit the first uplink transmission using the first transmit power and transmitting the second uplink transmission using the second transmit power. In some cases, the transmissions may be synchronous or asynchronous.

Figure 6:
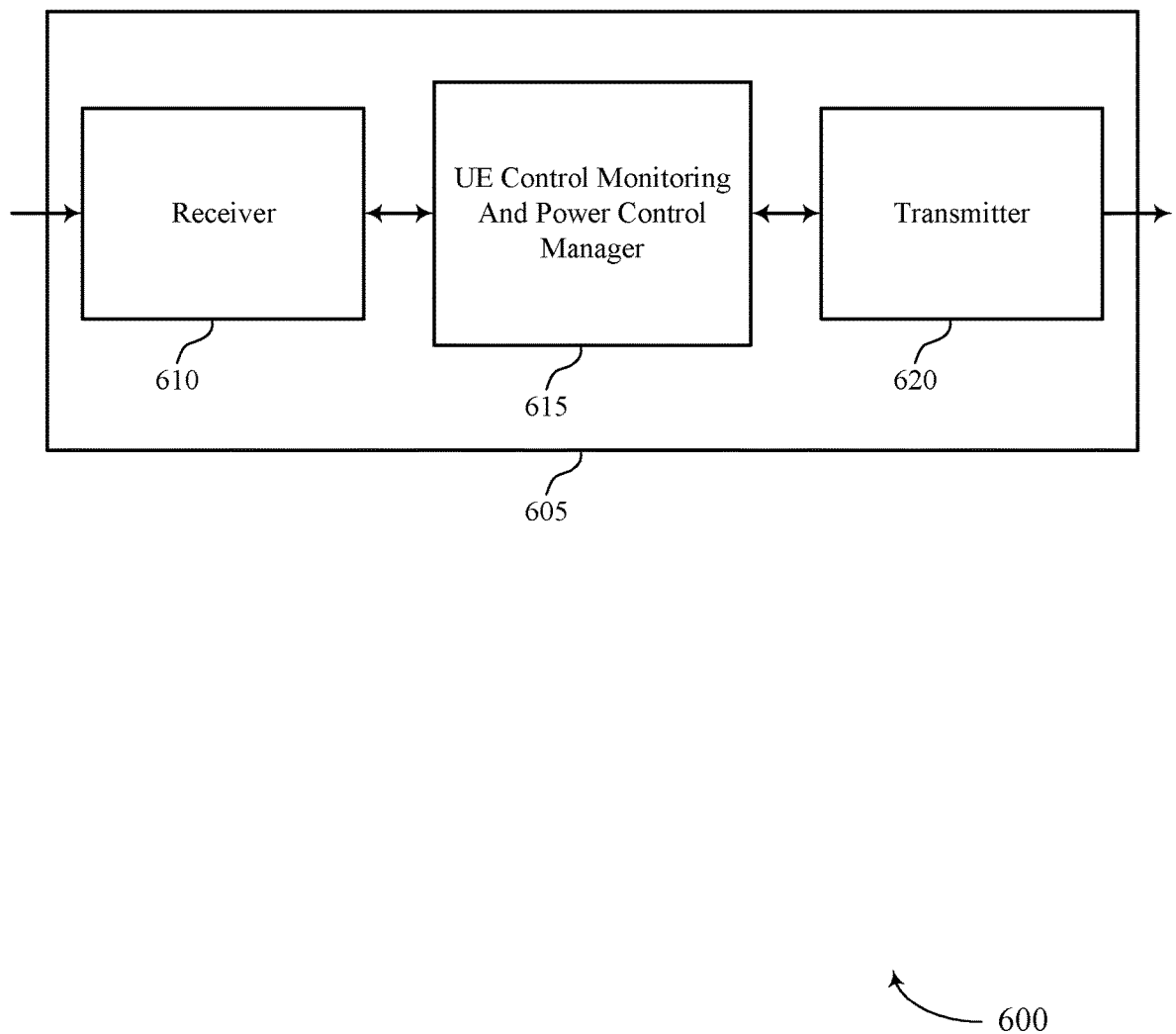
FIGS. 6 through 8 show block diagrams of a device in accordance with aspects of the present disclosure.

FIG. 6 shows a block diagram 600 of a wireless device 605 in accordance with aspects of the present disclosure. Wireless device 605 may be an example of aspects of a UE 115 as described herein. Wireless device 605 may include receiver 610, UE control monitoring and power control manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to control monitoring and power control for multi-link deployments, etc.). Information may be passed on to other components of the device. The receiver 610 may be an example of aspects of the transceiver 935 described with reference to FIG. 9. The receiver 610 may utilize a single antenna or a set of antennas.

UE control monitoring and power control manager 615 may be an example of aspects of the UE control monitoring and power control manager 915 described with reference to FIG. 9. UE control monitoring and power control manager 615 and/or at least some of its various sub-components may be implemented in hardware, software executed by a processor, firmware, or any combination thereof. If implemented in software executed by a processor, the functions of the UE control monitoring and power control manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE control monitoring and power control manager 615 and/or at least some of its various sub-components may be physically located at various positions, including being distributed such that portions of functions are implemented at different physical locations by one or more physical devices. In some examples, UE control monitoring and power control manager 615 and/or at least some of its various sub-components may be a separate and distinct component in accordance with various aspects of the present disclosure. In other examples, UE control monitoring and power control manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE control monitoring and power control manager 615 may receive a first downlink transmission from a first base station 105 via a first communication link, the first downlink transmission received on a carrier during a first TTI. UE control monitoring and power control manager 615 may receive a second downlink transmission from a second base station 105 via a second communication link, the second downlink transmission received on the carrier during a second TTI, where the first TTI and the second TTI at least partially overlap. Additionally, UE control monitoring and power control manager 615 may identify a set of search candidates within the first TTI and within the second TTI, where a number or timing of the set of search candidates is based on the first TTI and the second TTI partially overlapping, and monitor the set of search candidates for respective control information from the first base station 105 and the second base station 105.

UE control monitoring and power control manager 615 may also identify a first uplink transmission using a first communication link with a first base station 105, the first uplink transmission to be sent on a carrier during a first TTI. UE control monitoring and power control manager 615 may identify a second uplink transmission using a second communication link with a second base station 105, the second uplink transmission to be sent on the carrier during a second TTI, where the first TTI and the second TTI at least partially overlap. In some cases, UE control monitoring and power control manager 615 may identify an uplink power control mode by which the UE 115 is to operate when communicating with the first base station 105 and the second base station 105 on the carrier. UE control monitoring and power control manager 615 may determine, based on the uplink power control mode, a first transmit power to apply to the first uplink transmission during the first TTI and a second transmit power to apply to the second uplink transmission during the second TTI, and transmit the first uplink transmission using the first transmit power and transmitting the second uplink transmission using the second transmit power.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
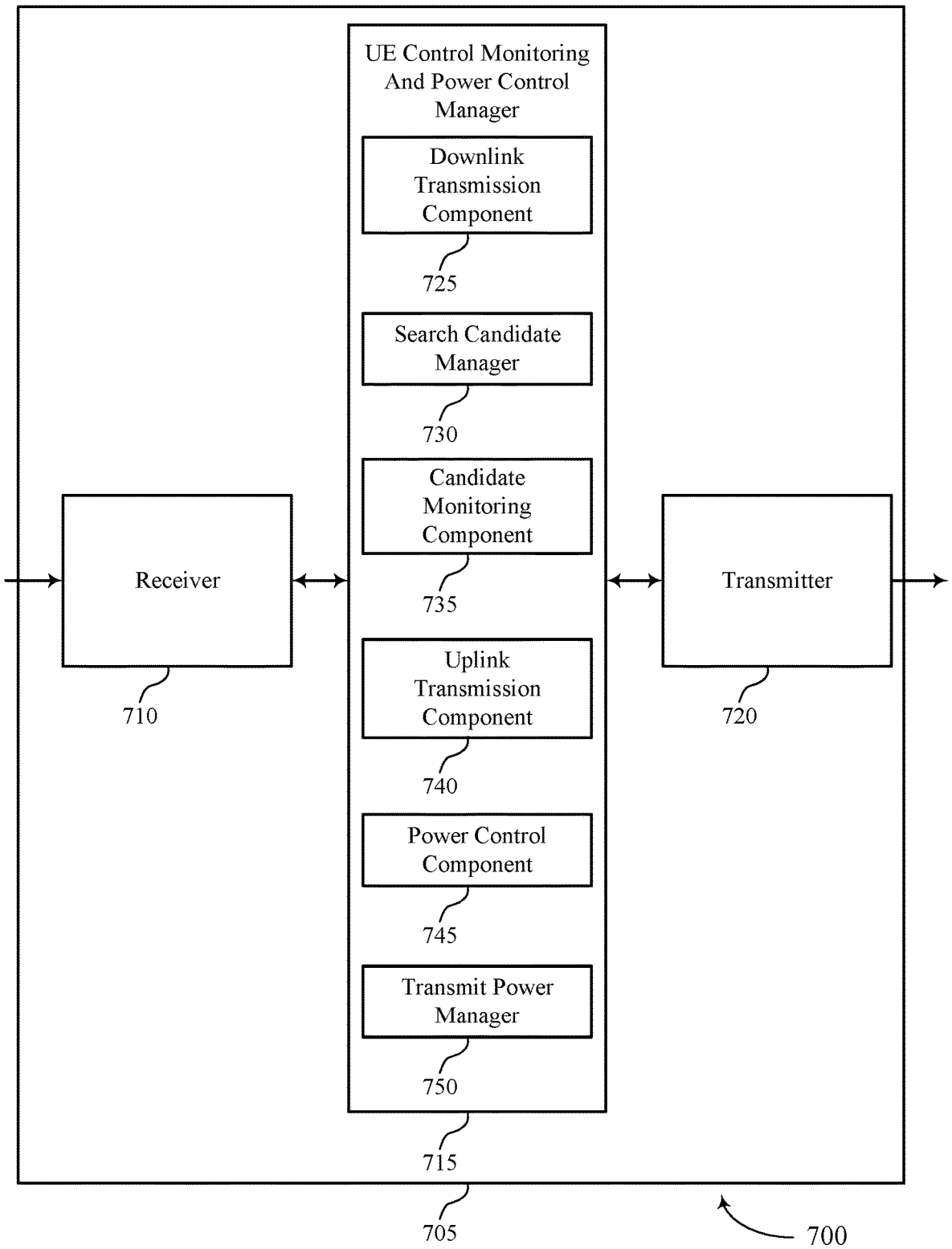

FIG. 7 shows a block diagram 700 of a wireless device 705 in accordance with aspects of the present disclosure. Wireless device 705 may be an example of aspects of a wireless device 605 or a UE 115 as described with reference to FIG. 6. Wireless device 705 may include receiver 710, UE control monitoring and power control manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to control monitoring and power control for multi-link deployments, etc.). Information may be passed on to other components of the device. The receiver 710 may be an example of aspects of the transceiver 935 described with reference to FIG. 9. The receiver 710 may utilize a single antenna or a set of antennas.

UE control monitoring and power control manager 715 may be an example of aspects of the UE control monitoring and power control manager 915 described with reference to FIG. 9. UE control monitoring and power control manager 715 may also include downlink transmission component 725, search candidate manager 730, candidate monitoring component 735, uplink transmission component 740, power control component 745, and transmit power manager 750.

Downlink transmission component 725 may receive a first downlink transmission from a first base station 105 via a first communication link, the first downlink transmission received on a carrier during a first TTI, and receive a second downlink transmission from a second base station 105 via a second communication link, the second downlink transmission received on the carrier during a second TTI, where the first TTI and the second TTI at least partially overlap. In some examples, downlink transmission component 725 may identify a time difference between the first downlink transmission and the second downlink transmission. In some cases, the second base station 105 has a non-ideal backhaul link with the first base station 105. In some cases, the first downlink transmission and the second downlink transmission are asynchronous. In some cases, the first communication link and the second communication link include respective beam links (e.g., in accordance with beamforming techniques in a system that supports mmW communications as described herein).

Search candidate manager 730 may identify a set of search candidates within the first TTI and within the second TTI, where a number or timing of the set of search candidates is based on the first TTI and the second TTI partially overlapping. In some cases, search candidate manager 730 may identify a second subset of search candidates within the second TTI, where the second subset of search candidates is non-overlapping with the first TTI. In some cases, identifying the set of search candidates includes identifying a restricted number of search candidates within each of the first TTI and the second TTI with respect to non-overlapping TTIs received by the UE from the first base station 105 and the second base station 105. In such cases, a sum of the restricted number of search candidates within the first TTI and the second TTI may be less than or equal to a threshold number of search candidates.

Additionally or alternatively, identifying the set of search candidates includes identifying a first subset of search candidates within the first TTI and identifying a second subset of search candidates within the second TTI. In some cases, the second TTI includes a mini-slot having a time-shifted control resource set (e.g., a CORESET) corresponding to the second subset of search candidates. In some cases, the second TTI includes two or more mini-slots that each include a CORESET corresponding to the second subset of search candidates. where a first mini-slot of the two or more mini-slots including a time-shifted CORESET that is contiguous with a subsequent CORESET of a subsequent mini-slot.

Candidate monitoring component 735 may monitor the set of search candidates for respective control information from the first base station 105 and the second base station 105. Uplink transmission component 740 may identify a first uplink transmission using a first communication link with the first base station 105, the first uplink transmission to be sent on a carrier during a first TTI. In some cases, uplink transmission component 740 may identify a second uplink transmission using a second communication link with the second base station 105, the second uplink transmission to be sent on the carrier during a second TTI, where the first TTI and the second TTI at least partially overlap. In some cases, the second base station 105 has a non-ideal backhaul link with the first base station 105.

Power control component 745 may identify an uplink power control mode by which the UE 115 is to operate when communicating with the first base station 105 and the second base station 105 on the carrier. For example, power control component 745 may identify a minimum reserved transmit power and a maximum transmit power, where each of a first transmit power and a second transmit power are equal to at least the minimum reserved transmit power. Power control component 745 may determine a remaining power based on a difference between the maximum transmit power and a sum of the first transmit power and the second transmit power, where the remaining power is shared between the first uplink transmission and the second uplink transmission. In some cases, the remaining power is shared between the first uplink transmission and the second uplink transmission based on a priority of the first communication link and a priority of the second communication link. In such cases, the first uplink transmission and the second uplink transmission may be synchronous.

Additionally or alternatively, power control component 745 may determine the remaining power based on a difference between the maximum transmit power and a sum of the first transmit power and the second transmit power, where the remaining power may be allocated to an uplink transmission that occurs temporally first. In such cases, the first uplink transmission and the second uplink transmission may be asynchronous. In some cases, power control component 745 may receive an indication of the uplink power control mode from a base station 105, where power control component 745 receives the indication via RRC messaging, a MAC CE, DCI, or a combination thereof.

Transmit power manager 750 may determine, based on the uplink power control mode, the first transmit power to apply to the first uplink transmission during the first TTI and the second transmit power to apply to the second uplink transmission during the second TTI. In some cases, transmit power manager 750 (e.g., in coordination with transmitter 720) may transmit the first uplink transmission using the first transmit power and may transmit the second uplink transmission using the second transmit power.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
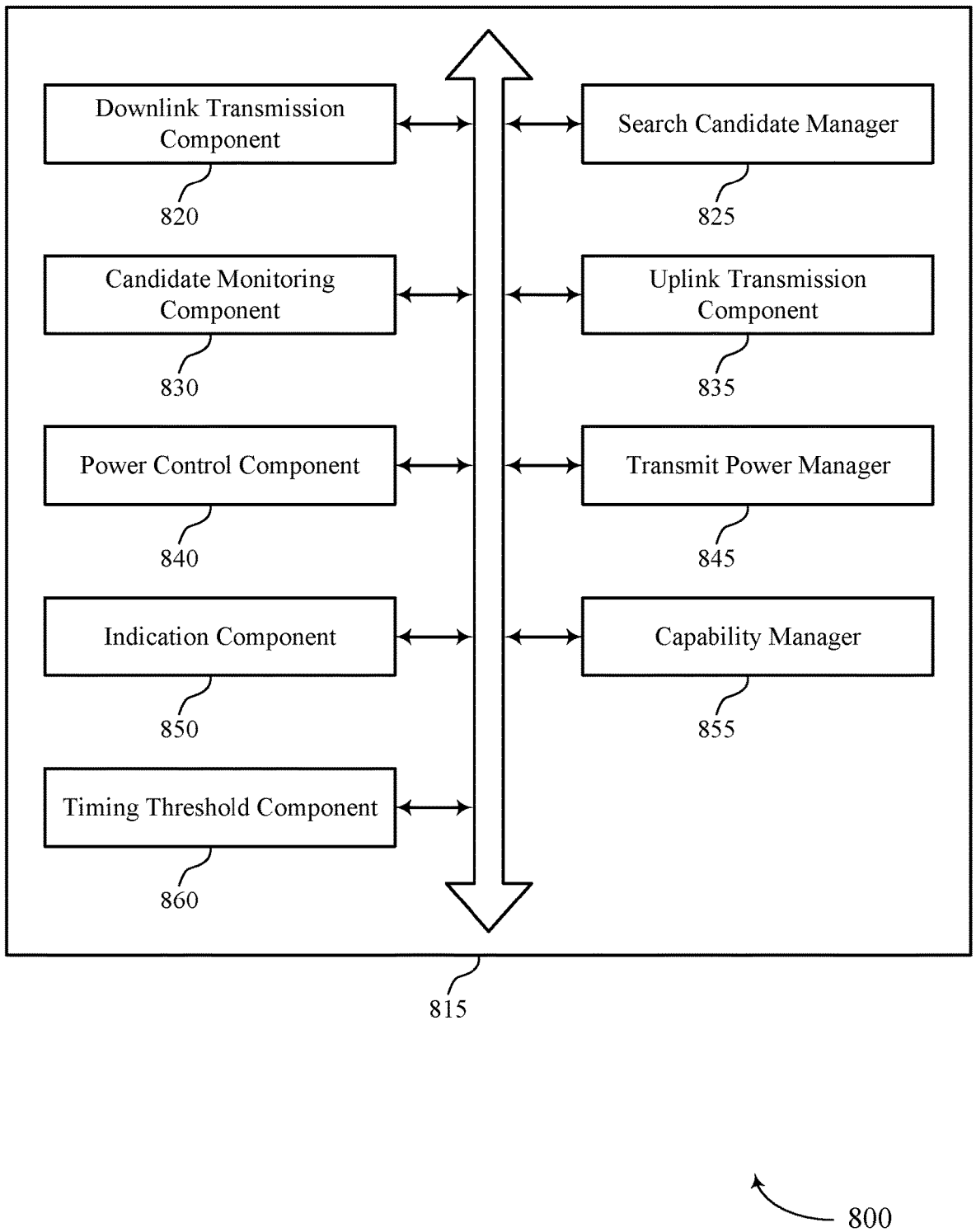

FIG. 8 shows a block diagram 800 of a UE control monitoring and power control manager 815 in accordance with aspects of the present disclosure. The UE control monitoring and power control manager 815 may be an example of aspects of a UE control monitoring and power control manager 615, a UE control monitoring and power control manager 715, or a UE control monitoring and power control manager 915 described with reference to FIGS. 6, 7, and 9. The UE control monitoring and power control manager 815 may include downlink transmission component 820, search candidate manager 825, candidate monitoring component 830, uplink transmission component 835, power control component 840, transmit power manager 845, indication component 850, capability manager 855, and timing threshold component 860. Each of these modules may communicate, directly or indirectly, with one another (e.g., via one or more buses).

Downlink transmission component 820 may receive a first downlink transmission from a first base station 105 via a first communication link, the first downlink transmission received on a carrier during a first TTI, and receive a second downlink transmission from a second base station 105 via a second communication link, the second downlink transmission received on the carrier during a second TTI, where the first TTI and the second TTI at least partially overlap. In some examples, downlink transmission component 820 may identify a time difference between the first downlink transmission and the second downlink transmission. In some cases, the second base station 105 has a non-ideal backhaul link with the first base station 105. In some cases, the first downlink transmission and the second downlink transmission are asynchronous. In some cases, the first communication link and the second communication link include respective beam links.

Search candidate manager 825 may identify a set of search candidates within the first TTI and within the second TTI, where a number or timing of the set of search candidates is based on the first TTI and the second TTI partially overlapping. In some cases, search candidate manager 825 may identify a second subset of search candidates within the second TTI, where the second subset of search candidates is non-overlapping with the first TTI. In some cases, identifying the set of search candidates includes identifying a restricted number of search candidates within each of the first TTI and the second TTI with respect to non-overlapping TTIs received by the UE from the first base station 105 and the second base station 105. In such cases, a sum of the restricted number of search candidates within the first TTI and the second TTI may be less than or equal to a threshold number of search candidates.

Candidate monitoring component 830 may monitor the set of search candidates for respective control information from the first base station 105 and the second base station 105. Uplink transmission component 835 may identify a first uplink transmission using a first communication link with the first base station 105, the first uplink transmission to be sent on a carrier during a first TTI. In some cases, uplink transmission component 835 may identify a second uplink transmission using a second communication link with the second base station 105, the second uplink transmission to be sent on the carrier during a second TTI, where the first TTI and the second TTI at least partially overlap. In some cases, the second base station 105 has a non-ideal backhaul link with the first base station 105.

Power control component 840 may identify an uplink power control mode by which the UE 115 is to operate when communicating with the first base station 105 and the second base station 105 on the carrier. For example, power control component 840 may identify a minimum reserved transmit power and a maximum transmit power, where each of a first transmit power and a second transmit power are equal to at least the minimum reserved transmit power. Power control component 840 may determine a remaining power based on a difference between the maximum transmit power and a sum of the first transmit power and the second transmit power, where the remaining power is shared between the first uplink transmission and the second uplink transmission. In some cases, the remaining power is shared between the first uplink transmission and the second uplink transmission based on a priority of the first communication link and a priority of the second communication link. In such cases, the first uplink transmission and the second uplink transmission may be synchronous.

Additionally or alternatively, power control component 840 may determine the remaining power based on a difference between the maximum transmit power and a sum of the first transmit power and the second transmit power, where the remaining power may be allocated to an uplink transmission that occurs temporally first. In such cases, the first uplink transmission and the second uplink transmission may be asynchronous. In some cases, power control component 840 may receive an indication of the uplink power control mode from a base station 105, where power control component 840 may receive the indication via RRC messaging, a MAC CE, DCI, or a combination thereof.

Transmit power manager 845 may determine, based on the uplink power control mode, the first transmit power to be applied to the first uplink transmission during the first TTI and the second transmit power to be applied to the second uplink transmission during the second TTI. In some cases, transmit power manager 845 (e.g., in coordination with transmitter 720) may transmit the first uplink transmission using the first transmit power and transmitting the second uplink transmission using the second transmit power. In some examples, the first transmit power may be based on a beam strength or a first beam index of the first communication link. Additional or alternatively, the second transmit power may be based on a beam strength or a second beam index of the second communication link.

Indication component 850 may transmit an indication of the time difference to the first base station 105, the second base station 105, or a combination thereof. In some cases, indication component 850 may transmit an indication of a determined capability to a base station 105. In some examples, indication component 850 may transmit an indication of a timing threshold to a base station 105. In some cases, indication component 850 may transmit the indication of the time difference via RRC messaging, a MAC CE, UCI, or a combination thereof. Capability manager 855 may determine the capability of the UE 115 to support the uplink power control mode. Timing threshold component 860 may determine a timing threshold associated with a capability of the UE 115 to support the uplink power control mode.

Figure 9:
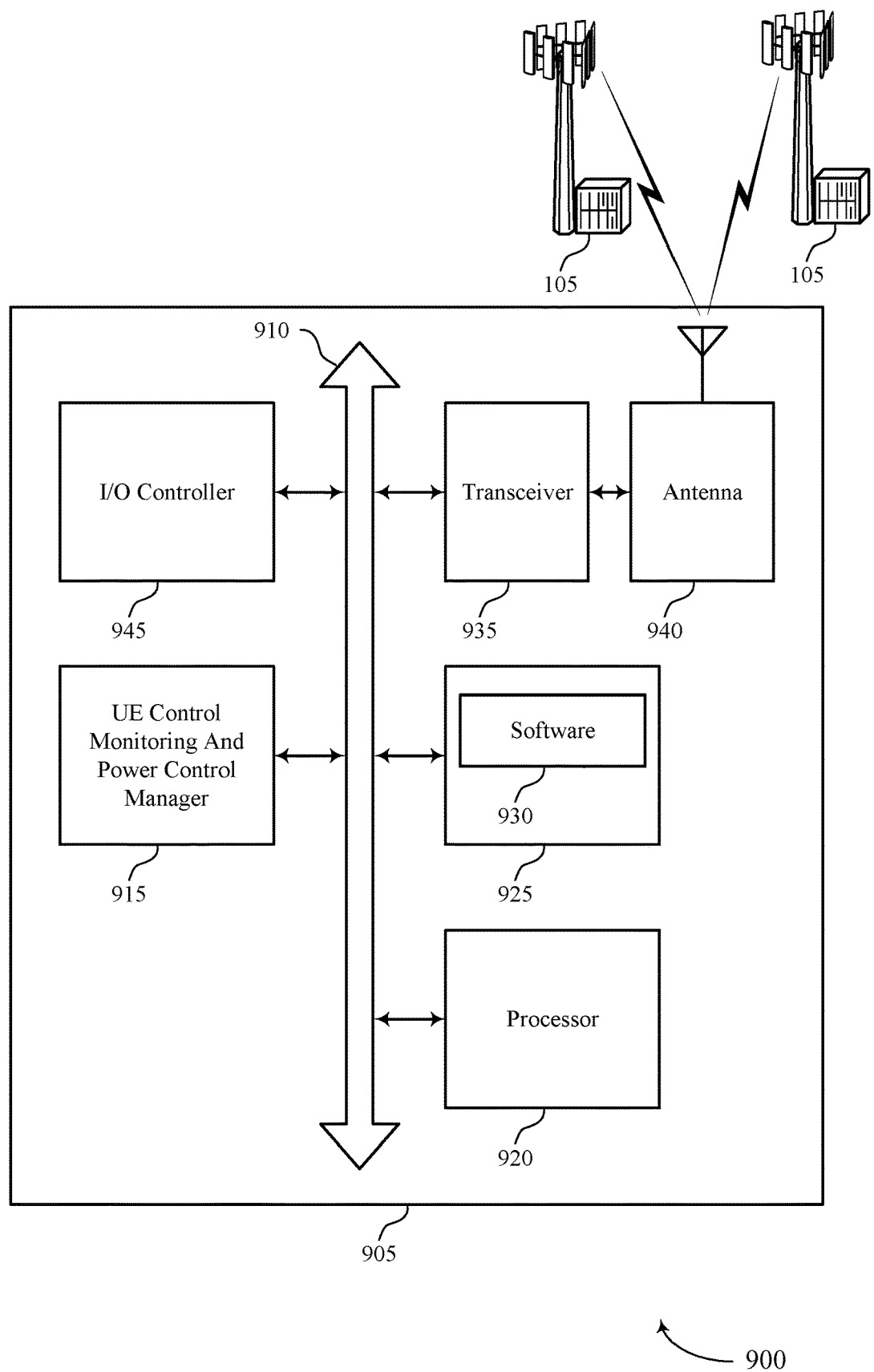
FIG. 9 illustrates a block diagram of a system including a UE in accordance with aspects of the present disclosure.

FIG. 9 shows a diagram of a system 900 including a device 905 in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including UE control monitoring and power control manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting control monitoring and power control for multi-link deployments).

Memory 925 may include random-access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support control monitoring and power control for multi-link deployments. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
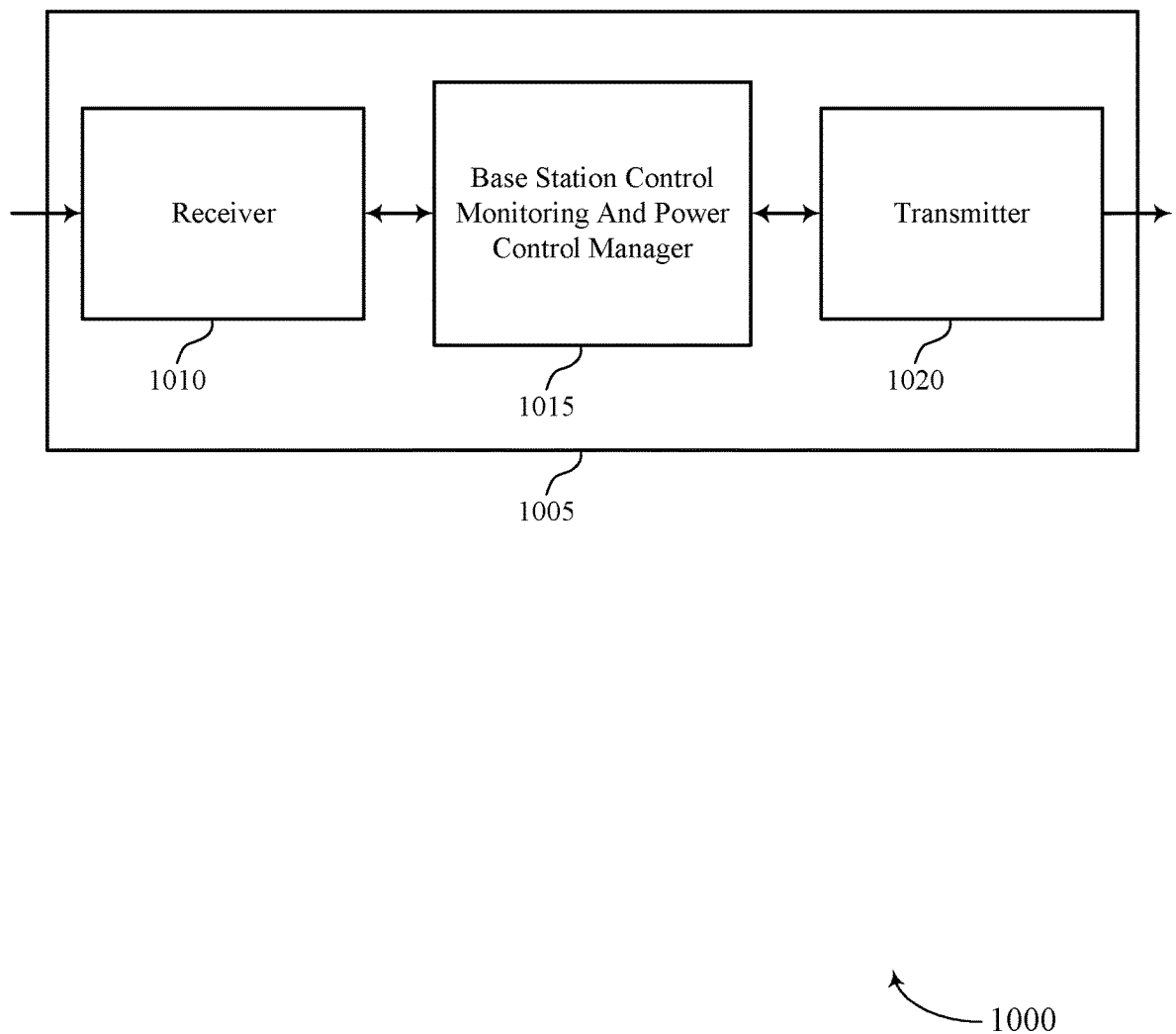
FIGS. 10 through 12 show block diagrams of a device in accordance with aspects of the present disclosure.

FIG. 10 shows a block diagram 1000 of a wireless device 1005 that supports control monitoring and power control for multi-link deployments in accordance with aspects of the present disclosure. Wireless device 1005 may be an example of aspects of a base station 105 as described herein. Wireless device 1005 may include receiver 1010, base station control monitoring and power control manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to control monitoring and power control for multi-link deployments, etc.). Information may be passed on to other components of the device. The receiver 1010 may be an example of aspects of the transceiver 1335 described with reference to FIG. 13. The receiver 1010 may utilize a single antenna or a set of antennas.

Base station control monitoring and power control manager 1015 may be an example of aspects of the base station control monitoring and power control manager 1315 described with reference to FIG. 13. Base station control monitoring and power control manager 1015 and/or at least some of its various sub-components may be implemented in hardware, software executed by a processor, firmware, or any combination thereof. If implemented in software executed by a processor, the functions of the base station control monitoring and power control manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station control monitoring and power control manager 1015 and/or at least some of its various sub-components may be physically located at various positions, including being distributed such that portions of functions are implemented at different physical locations by one or more physical devices. In some examples, base station control monitoring and power control manager 1015 and/or at least some of its various sub-components may be a separate and distinct component in accordance with various aspects of the present disclosure. In other examples, base station control monitoring and power control manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station control monitoring and power control manager 1015 may identify that a UE 115 is in communication with a first base station 105 and a second base station 105 and identify that a first downlink transmission from the first base station 105 to the UE 115 and a second downlink transmission from the second base station 105 to the UE 115 will each be transmitted during respective TTIs that at least partially overlap. Base station control monitoring and power control manager 1015 may determine a control monitoring configuration for a number or timing of a set of search candidates based on the respective TTIs that at least partially overlap and transmit the first downlink transmission including the set of search candidates in accordance with the control monitoring configuration.

Base station control monitoring and power control manager 1015 may also identify that the UE 115 is in communication with the first base station 105 and the second base station 105, where the first base station 105 communicates with the UE 115 on a first communication link on a carrier and the second base station 105 communicates with the UE 115 on a second communication link on the carrier. In some cases, base station control monitoring and power control manager 1015 may identify that a first uplink transmission from the UE 115 to the first base station 105 and a second uplink transmission from the UE 115 to the second base station 105 will each be transmitted during respective TTIs that at least partially overlap and determine an uplink power control mode by which the UE 115 is to operate when transmitting on the first communication link and the second communication link on the carrier. Base station control monitoring and power control manager 1015 may then transmit an indication of the uplink power control mode to the UE 115.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
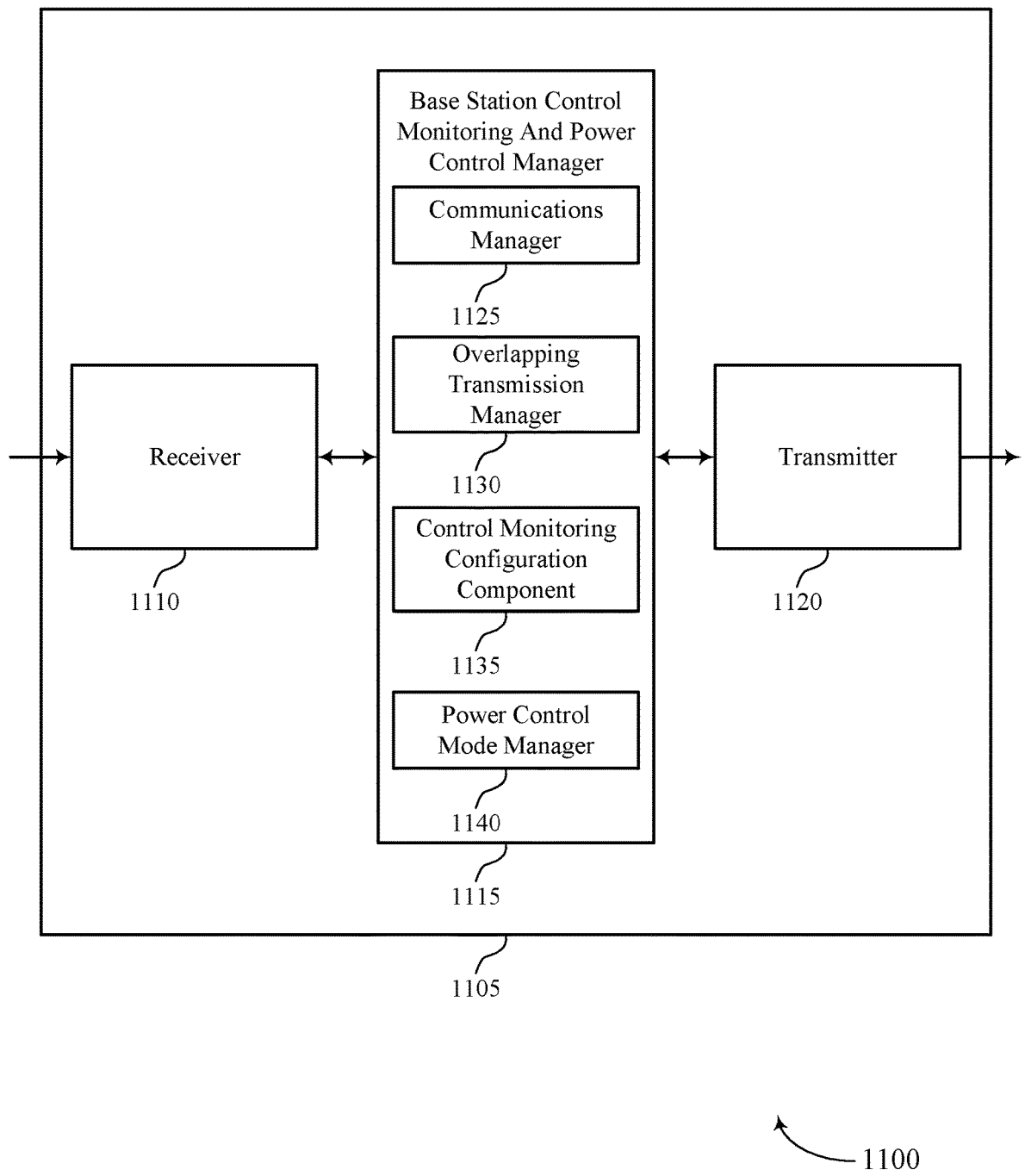

FIG. 11 shows a block diagram 1100 of a wireless device 1105 in accordance with aspects of the present disclosure. Wireless device 1105 may be an example of aspects of a wireless device 1005 or a base station 105 as described with reference to FIG. 10. Wireless device 1105 may include receiver 1110, base station control monitoring and power control manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to control monitoring and power control for multi-link deployments, etc.). Information may be passed on to other components of the device. The receiver 1110 may be an example of aspects of the transceiver 1335 described with reference to FIG. 13. The receiver 1110 may utilize a single antenna or a set of antennas.

Base station control monitoring and power control manager 1115 may be an example of aspects of the base station control monitoring and power control manager 1315 described with reference to FIG. 13. Base station control monitoring and power control manager 1115 may also include communications manager 1125, overlapping transmission manager 1130, control monitoring configuration component 1135, and power control mode manager 1140.

Communications manager 1125 may identify that a UE 115 is in communication with a first base station 105 and a second base station 105, where the first base station 105 communicates with the UE 115 on a first communication link on a carrier and the second base station 105 communicates with the UE 115 on a second communication link on the carrier. In some cases, communications manager 1125 may transmit a first downlink transmission including a set of search candidates in accordance with a control monitoring configuration.

Communications manager 1125 may transmit the set of search candidates within two or more mini-slots that each include a control resource set corresponding to the set of search candidates, where a first mini-slot of the two or more mini-slots may include a time-shifted control resource set that is contiguous with a subsequent control resource set of a subsequent mini-slot. In some cases, communications manager 1125 may transmit the set of search candidates within a mini-slot of the first downlink transmission, where the mini-slot includes a time-shifted control resource set corresponding to the set of search candidates. In some cases, the second base station 105 has a non-ideal backhaul link with the first base station 105.

Overlapping transmission manager 1130 may identify that a first downlink transmission from the first base station 105 to the UE 115 and a second downlink transmission from the second base station 105 to the UE 115 will each be transmitted during respective TTIs that at least partially overlap. In some cases, overlapping transmission manager 1130 may identify that a first uplink transmission from the UE 115 to the first base station 105 and a second uplink transmission from the UE 115 to the second base station 105 will each be transmitted during respective TTIs that at least partially overlap. In some cases, the first downlink transmission and the second downlink transmission may be asynchronous.

Control monitoring configuration component 1135 may determine a control monitoring configuration for a number or timing of a set of search candidates based on the respective TTIs that at least partially overlap. In some cases, determining the control monitoring configuration includes determining a restricted number of search candidates within a first TTI of the first downlink transmission with respect to non-overlapping TTIs transmitted by the first base station 105 and the second base station 105. In some cases, a sum of the restricted number of search candidates within the first TTI and a number of search candidates of a second TTI of the second downlink transmission is less than or equal to a threshold number of search candidates, where the first TTI and the second TTI at least partially overlap.

Power control mode manager 1140 may determine an uplink power control mode by which the UE 115 is to operate when transmitting on the first communication link and the second communication link on the carrier. In such cases, a remaining power that is based on a difference between a maximum transmit power and a sum of transmit powers applied to each of the first communication link and the second communication link may be shared between the first communication link and the second communication link. Additionally or alternatively, the remaining power that is based on the difference between the maximum transmit power and a sum of transmit powers applied to each of the first communication link and the second communication link is allocated to an uplink communication that occurs temporally first.

Power control mode manager 1140 may also transmit an indication of the uplink power control mode to the UE 115, and determine the uplink power control mode based on an indicated capability (e.g., received from the UE 115). In some cases, transmitting the indication of the uplink power control mode includes transmitting the indication of the uplink power control mode via RRC messaging, a MAC CE, DCI, or a combination thereof.

In some examples, power control mode manager 1140 may determine the uplink power control mode based on a timing threshold (e.g., as determined by the UE 115). The uplink power control mode may include a minimum reserved transmit power applied to each of the first communication link and the second communication link. In some cases, the uplink power control mode may include a minimum reserved transmit power if a delay between receiving and transmitting information on communication links does not satisfy a threshold. In some other cases, the remaining power is shared between the first uplink transmission and the second uplink transmission based on a priority of the first communication link and a priority of the second communication link. In some cases, the first uplink transmission and the second uplink transmission are synchronous. In some cases, the first uplink transmission and the second uplink transmission are asynchronous. In some cases, the uplink power control mode includes a minimum reserved transmit power applied to each of the first communication link and the second communication link.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
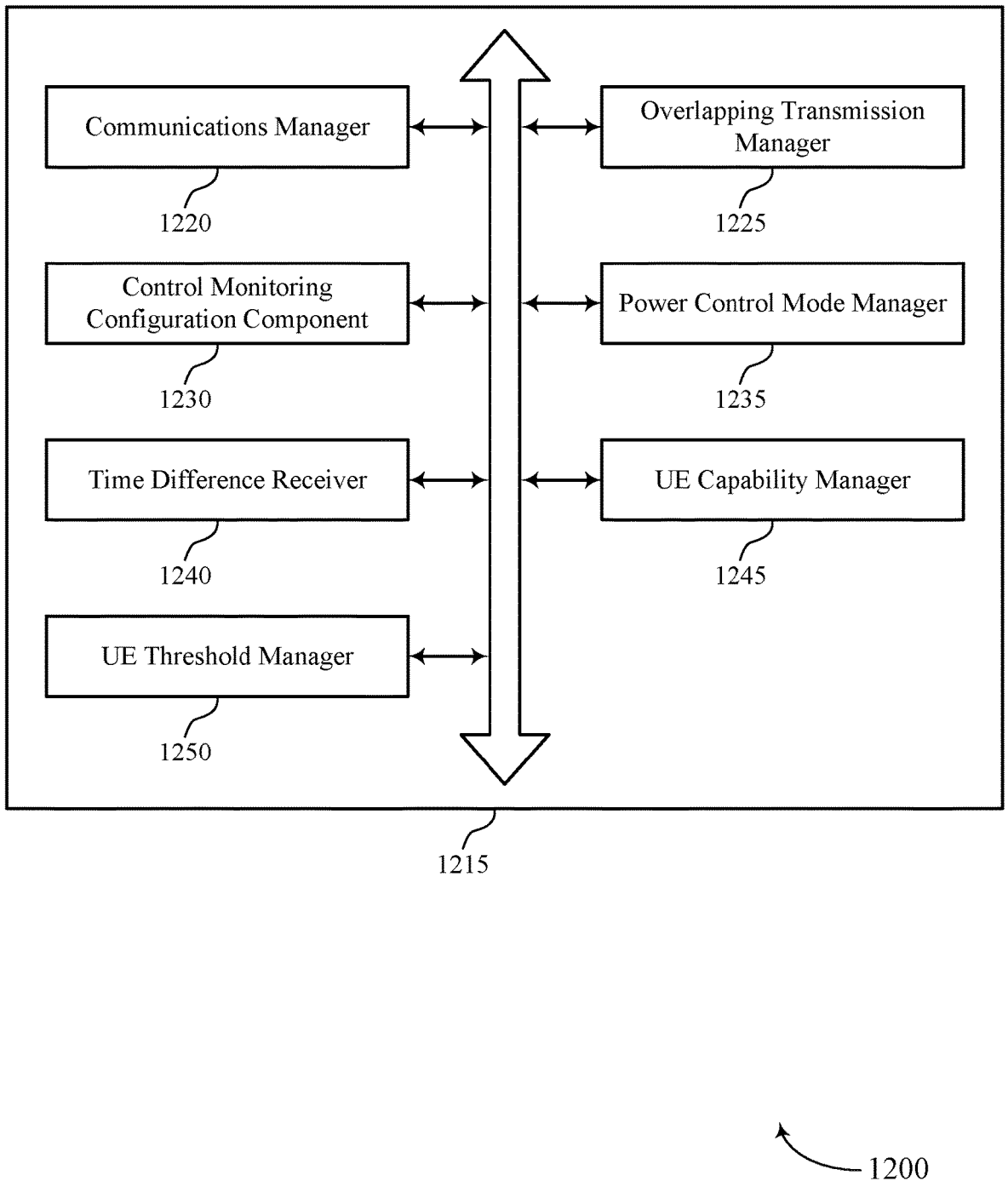

FIG. 12 shows a block diagram 1200 of a base station control monitoring and power control manager 1215 that supports control monitoring and power control for multi-link deployments in accordance with aspects of the present disclosure. The base station control monitoring and power control manager 1215 may be an example of aspects of a base station control monitoring and power control manager 1315 described with reference to FIGS. 10, 11, and 13. The base station control monitoring and power control manager 1215 may include communications manager 1220, overlapping transmission manager 1225, control monitoring configuration component 1230, power control mode manager 1235, time difference receiver 1240, UE capability manager 1245, and UE threshold manager 1250. Each of these modules may communicate, directly or indirectly, with one another (e.g., via one or more buses).

Communications manager 1220 may identify that a UE 115 is in communication with a first base station 105 and a second base station 105, identify that a UE 115 is in communication with the first base station 105 and a second base station 105, where the first base station 105 communicates with the UE on a first communication link on a carrier and the second base station 105 communicates with the UE on a second communication link on the carrier. In some cases, communications manager 1220 may transmit a first downlink transmission including a set of search candidates in accordance with a control monitoring configuration. Communications manager 1220 may transmit the set of search candidates within two or more mini-slots that each include a control resource set corresponding to the set of search candidates, where a first mini-slot of the two or more mini-slots may include a time-shifted control resource set that is contiguous with a subsequent control resource set of a subsequent mini-slot. In some cases, communications manager 1220 may transmit the set of search candidates within a mini-slot of the first downlink transmission, where the mini-slot includes a time-shifted control resource set corresponding to the set of search candidates, In some cases, the second base station 105 has a non-ideal backhaul link with the first base station 105.

Overlapping transmission manager 1225 may identify that a first downlink transmission from the first base station 105 to the UE 115 and a second downlink transmission from the second base station 105 to the UE 115 will each be transmitted during respective TTIs that at least partially overlap. In some cases, overlapping transmission manager 1225 may identify that a first uplink transmission from the UE 115 to the first base station 105 and a second uplink transmission from the UE 115 to the second base station 105 will each be transmitted during respective TTIs that at least partially overlap. In some cases, the first downlink transmission and the second downlink transmission may be asynchronous.

Control monitoring configuration component 1230 may determine a control monitoring configuration for a number or timing of a set of search candidates based on the respective TTIs that at least partially overlap. In some cases, determining the control monitoring configuration includes determining a restricted number of search candidates within a first TTI of the first downlink transmission with respect to non-overlapping TTIs transmitted by the first base station 105 and the second base station 105. In some cases, a sum of the restricted number of search candidates within the first TTI and a number of search candidates of a second TTI of the second downlink transmission is less than or equal to a threshold number of search candidates, where the first TTI and the second TTI at least partially overlap.

Power control mode manager 1235 may determine an uplink power control mode by which the UE 115 is to operate when transmitting on the first communication link and the second communication link on the carrier. In such cases, a remaining power that is based on a difference between a maximum transmit power and a sum of transmit powers applied to each of the first communication link and the second communication link may be shared between the first communication link and the second communication link. Additionally or alternatively, the remaining power that is based on the difference between the maximum transmit power and a sum of transmit powers applied to each of the first communication link and the second communication link is allocated to an uplink communication that occurs temporally first.

Power control mode manager 1235 may also transmit an indication of the uplink power control mode to the UE 115, and determine the uplink power control mode based on an indicated capability (e.g., received from the UE 115). In some cases, transmitting the indication of the uplink power control mode includes transmitting the indication of the uplink power control mode via RRC messaging, a MAC CE, DCI, or a combination thereof.

In some examples, power control mode manager 1235 may determine the uplink power control mode based on a timing threshold (e.g., as determined by the UE 115). The uplink power control mode may include a minimum reserved transmit power applied to each of the first communication link and the second communication link. In some cases, the remaining power is shared between the first uplink transmission and the second uplink transmission based on a priority of the first communication link and a priority of the second communication link. In some cases, the first uplink transmission and the second uplink transmission are synchronous. In some cases, the first uplink transmission and the second uplink transmission are asynchronous. In some cases, the uplink power control mode includes a minimum reserved transmit power applied to each of the first communication link and the second communication link.

Time difference receiver 1240 may receive, from the UE 115, an indication of the time difference between downlink transmissions received at the UE 115, where the timing of the set of search candidates is based on the time difference. In some cases, time difference receiver 1240 may receive the indication of the time difference via RRC messaging, a MAC CE, UCI, or a combination thereof. UE capability manager 1245 may receive an indication of a capability of the UE 115 to support the uplink power control mode. UE threshold manager 1250 may receive an indication of a timing threshold associated with a capability of the UE 115 to support the uplink power control mode.

Figure 13:
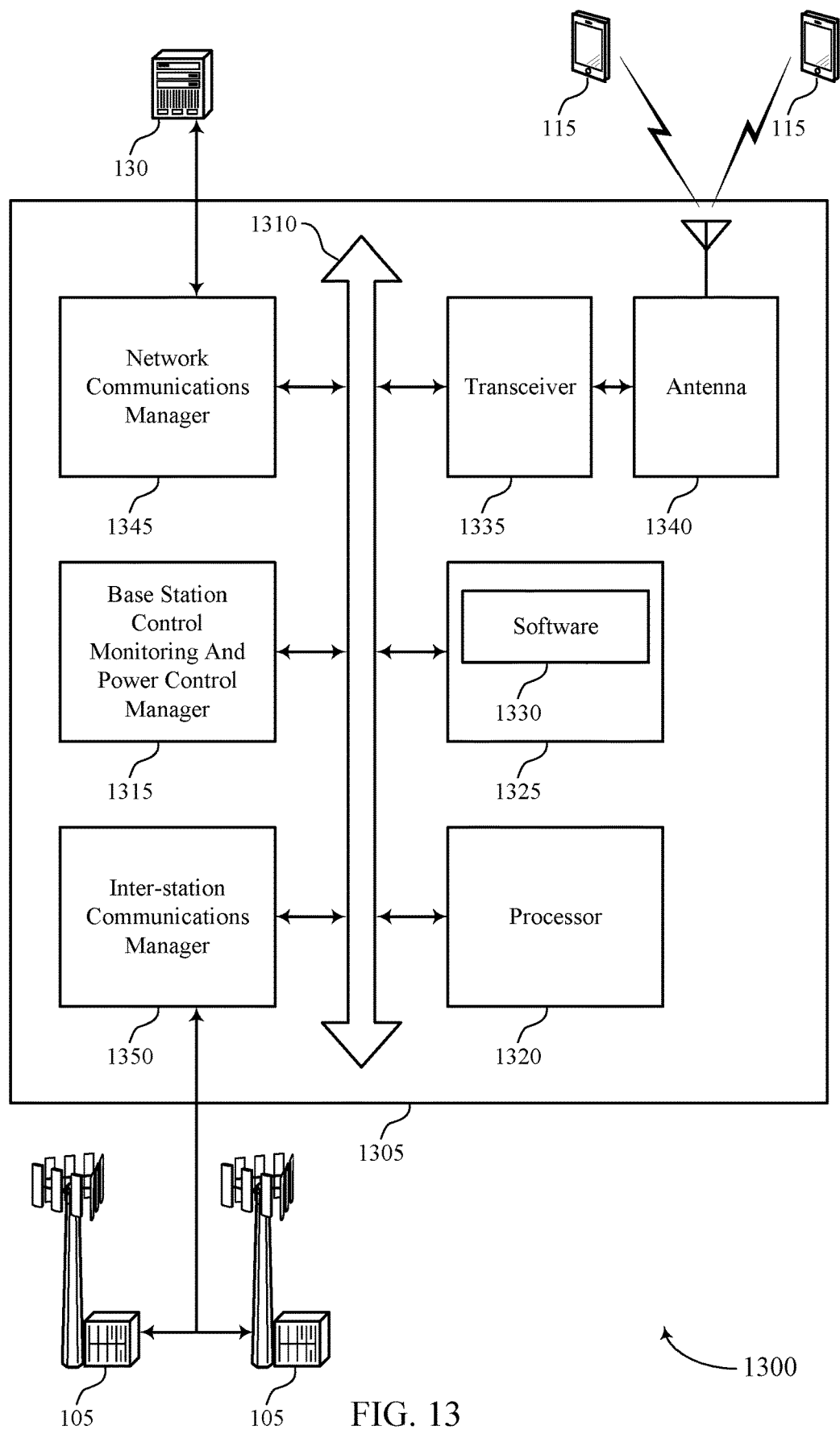
FIG. 13 illustrates a block diagram of a system including a base station in accordance with aspects of the present disclosure.

FIG. 13 shows a diagram of a system 1300 including a device 1305 in accordance with aspects of the present disclosure. Device 1305 may be an example of or include the components of base station 105 as described herein, e.g., with reference to FIG. 1. Device 1305 may include components for bi-directional voice and data communications including components for transmitting and receiving communications, including base station control monitoring and power control manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting control monitoring and power control for multi-link deployments).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support control monitoring and power control for multi-link deployments. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described herein. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
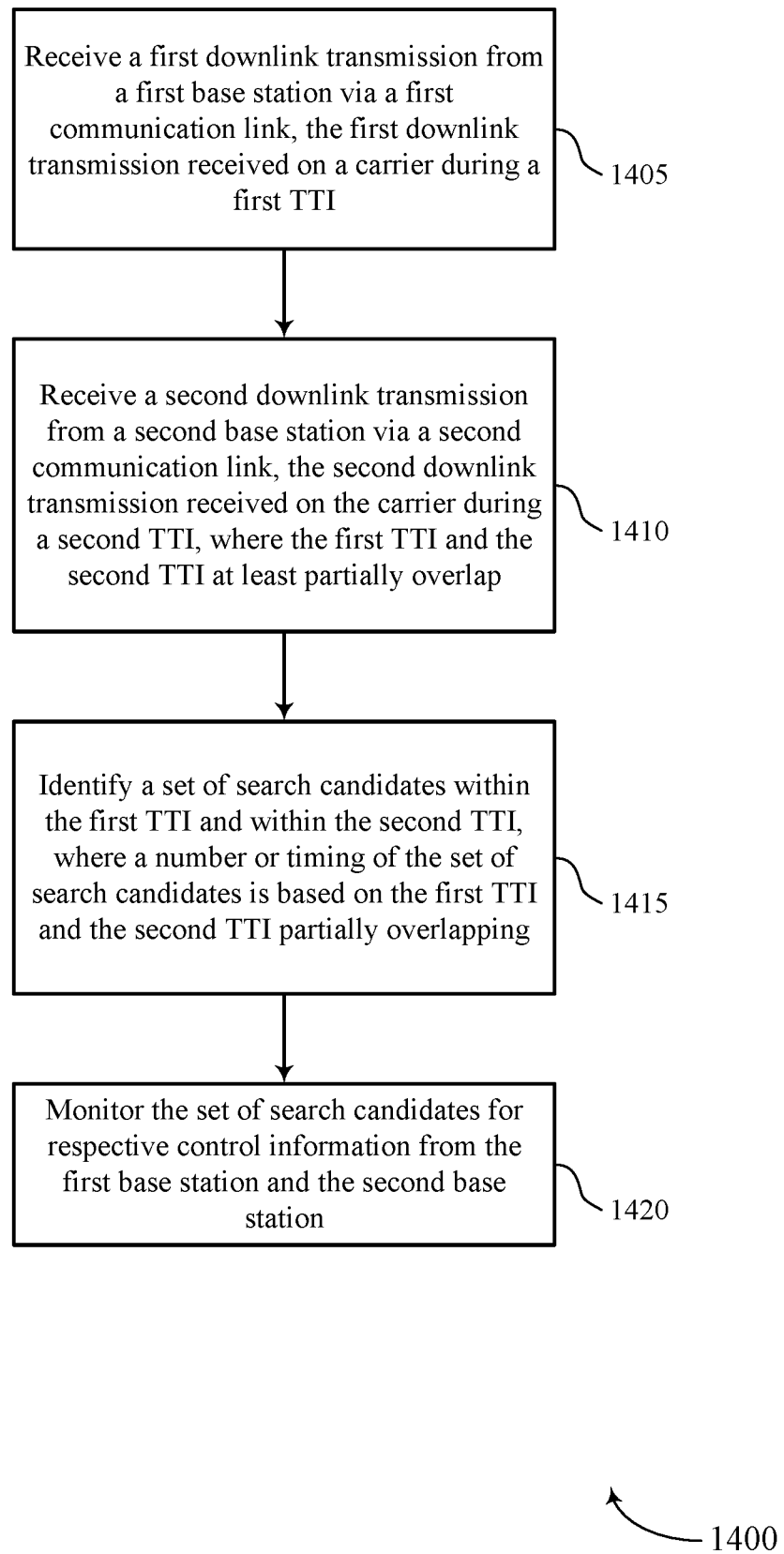
FIGS. 14 through 19 illustrate methods in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE control monitoring and power control manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1405 the UE 115 may receive a first downlink transmission from a first base station 105 via a first communication link, the first downlink transmission received on a carrier during a first TTI. The operations of 1405 may be performed according to the methods described herein. In certain examples, aspects of the operations of 1405 may be performed by a downlink transmission component as described with reference to FIGS. 6 through 9.

At 1410 the UE 115 may receive a second downlink transmission from a second base station 105 via a second communication link, the second downlink transmission received on the carrier during a second TTI, where the first TTI and the second TTI at least partially overlap. The operations of 1410 may be performed according to the methods described herein. In certain examples, aspects of the operations of 1410 may be performed by a downlink transmission component as described with reference to FIGS. 6 through 9.

At 1415 the UE 115 may identify a set of search candidates within the first TTI and within the second TTI, where a number or timing of the set of search candidates is based on the first TTI and the second TTI partially overlapping. The operations of 1415 may be performed according to the methods described herein. In certain examples, aspects of the operations of 1415 may be performed by a search candidate manager as described with reference to FIGS. 6 through 9.

At 1420 the UE 115 may monitor the set of search candidates for respective control information from the first base station 105 and the second base station 105. The operations of 1420 may be performed according to the methods described herein. In certain examples, aspects of the operations of 1420 may be performed by a candidate monitoring component as described with reference to FIGS. 6 through 9.

Figure 15:
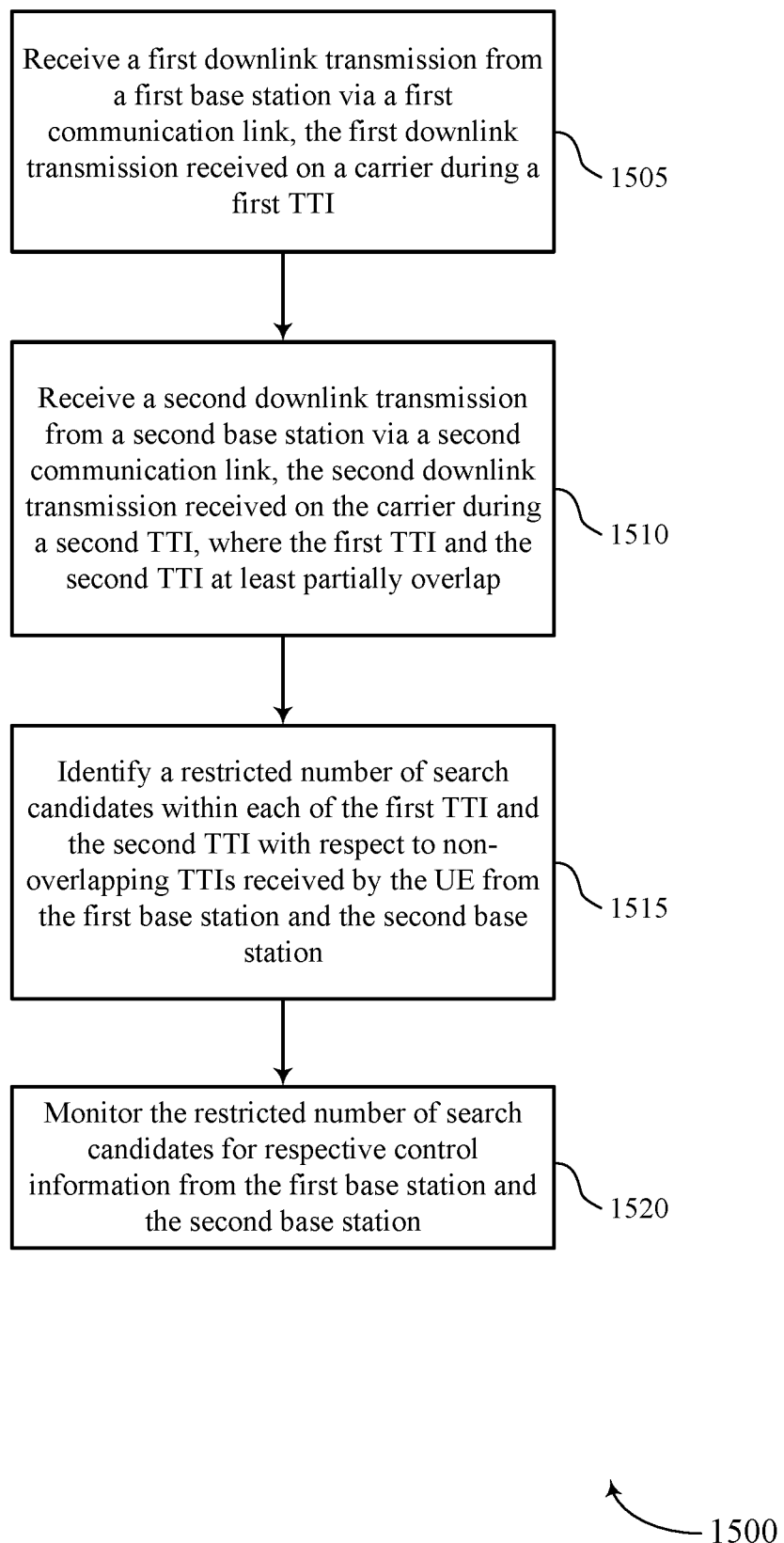

FIG. 15 shows a flowchart illustrating a method 1500 in accordance with aspects of the present disclosure. The operations of method 1500 may be implemented by a UE 115 or its components as described herein. For example, the operations of method 1500 may be performed by a UE control monitoring and power control manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive a first downlink transmission from a first base station 105 via a first communication link, the first downlink transmission received on a carrier during a first TTI. The operations of 1505 may be performed according to the methods described herein. In certain examples, aspects of the operations of 1505 may be performed by a downlink transmission component as described with reference to FIGS. 6 through 9.

At 1510 the UE 115 may receive a second downlink transmission from a second base station 105 via a second communication link, the second downlink transmission received on the carrier during a second TTI, where the first TTI and the second TTI at least partially overlap. The operations of 1510 may be performed according to the methods described herein. In certain examples, aspects of the operations of 1510 may be performed by a downlink transmission component as described with reference to FIGS. 6 through 9.

At 1515 the UE 115 may identify a restricted number of search candidates within each of the first TTI and the second TTI with respect to non-overlapping TTIs received by the UE 115 from the first base station 105 and the second base station 105. The operations of 1515 may be performed according to the methods described herein. In certain examples, aspects of the operations of 1515 may be performed by a search candidate manager as described with reference to FIGS. 6 through 9.

At 1520 the UE 115 may monitor the set of search candidates for respective control information from the first base station 105 and the second base station 105. The operations of 1520 may be performed according to the methods described herein. In certain examples, aspects of the operations of 1520 may be performed by a candidate monitoring component as described with reference to FIGS. 6 through 9.

Figure 16:
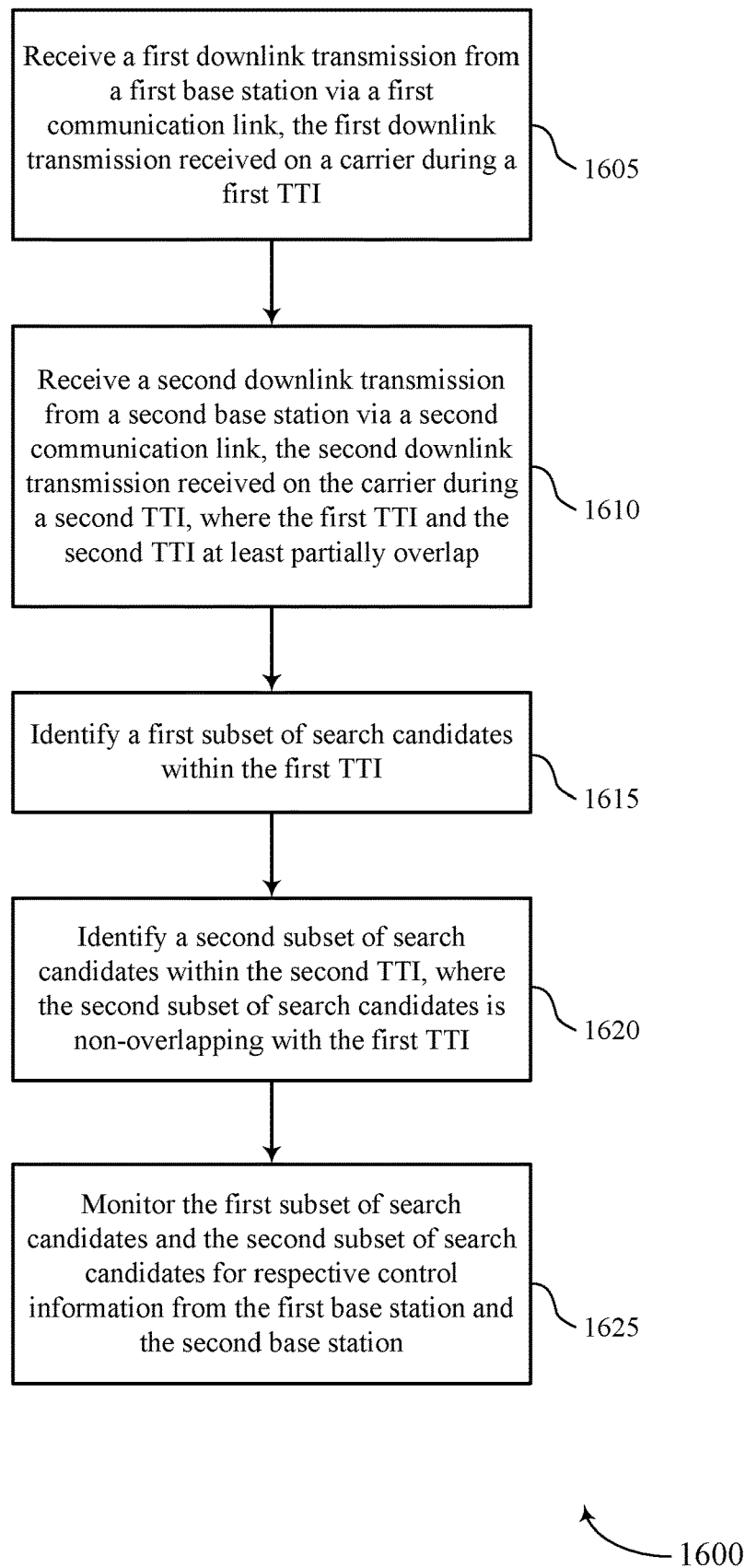

FIG. 16 shows a flowchart illustrating a method 1600 in accordance with aspects of the present disclosure. The operations of method 1600 may be implemented by a UE 115 or its components as described herein. For example, the operations of method 1600 may be performed by a UE control monitoring and power control manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive a first downlink transmission from a first base station 105 via a first communication link, the first downlink transmission received on a carrier during a first TTI. The operations of 1605 may be performed according to the methods described herein. In certain examples, aspects of the operations of 1605 may be performed by a downlink transmission component as described with reference to FIGS. 6 through 9.

At 1610 the UE 115 may receive a second downlink transmission from a second base station 105 via a second communication link, the second downlink transmission received on the carrier during a second TTI, where the first TTI and the second TTI at least partially overlap. The operations of 1610 may be performed according to the methods described herein. In certain examples, aspects of the operations of 1610 may be performed by a downlink transmission component as described with reference to FIGS. 6 through 9.

At 1615 the UE 115 may identify a first subset of search candidates within the first TTI. The operations of 1615 may be performed according to the methods described herein. In certain examples, aspects of the operations of 1615 may be performed by a search candidate manager as described with reference to FIGS. 6 through 9.

At 1620 the UE 115 may identify a second subset of search candidates within the second TTI, where the second subset of search candidates is non-overlapping with the first TTI. The operations of 1620 may be performed according to the methods described herein. In certain examples, aspects of the operations of 1620 may be performed by a search candidate manager as described with reference to FIGS. 6 through 9.

At 1625 the UE 115 may monitor the set of search candidates for respective control information from the first base station 105 and the second base station 105. The operations of 1625 may be performed according to the methods described herein. In certain examples, aspects of the operations of 1625 may be performed by a candidate monitoring component as described with reference to FIGS. 6 through 9.

Figure 17:
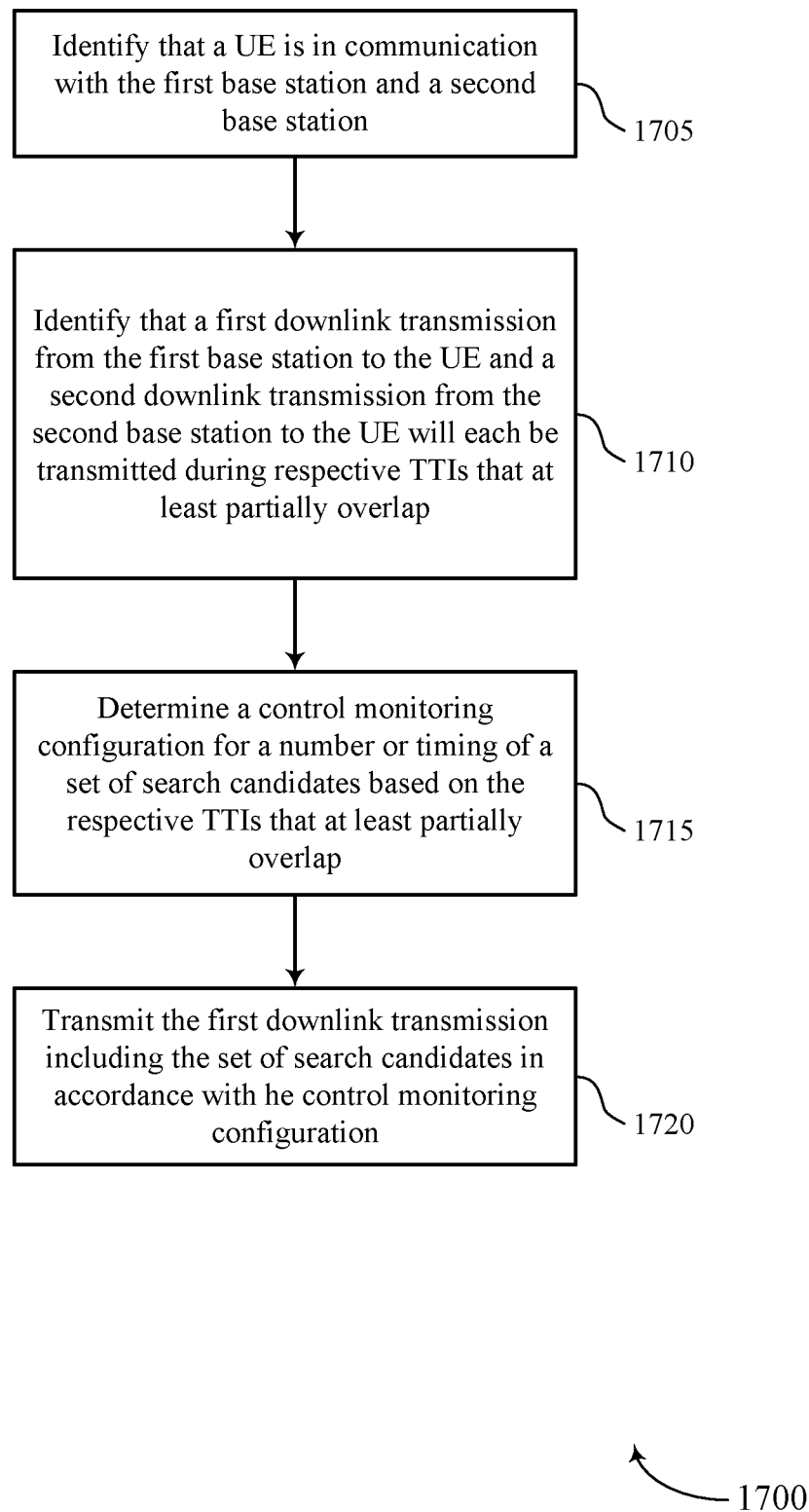

FIG. 17 shows a flowchart illustrating a method 1700 in accordance with aspects of the present disclosure. The operations of method 1700 may be implemented by a base station 105 (e.g., a first base station 105) or its components as described herein. For example, the operations of method 1700 may be performed by a base station control monitoring and power control manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1705 the first base station 105 may identify that a UE 115 is in communication with the first base station 105 and a second base station 105. The operations of 1705 may be performed according to the methods described herein. In certain examples, aspects of the operations of 1705 may be performed by a communications manager as described with reference to FIGS. 10 through 13.

At 1710 the first base station 105 may identify that a first downlink transmission from the first base station 105 to the UE 115 and a second downlink transmission from the second base station 105 to the UE 115 will each be transmitted during respective TTIs that at least partially overlap. The operations of 1710 may be performed according to the methods described herein. In certain examples, aspects of the operations of 1710 may be performed by an overlapping transmission manager as described with reference to FIGS. 10 through 13.

At 1715 the first base station 105 may determine a control monitoring configuration for a number or timing of a set of search candidates based on the respective TTIs that at least partially overlap. The operations of 1715 may be performed according to the methods described herein. In certain examples, aspects of the operations of 1715 may be performed by a control monitoring configuration component as described with reference to FIGS. 10 through 13.

At 1720 the first base station 105 may transmit the first downlink transmission including the set of search candidates in accordance with the control monitoring configuration. The operations of 1720 may be performed according to the methods described herein. In certain examples, aspects of the operations of 1720 may be performed by a communications manager as described with reference to FIGS. 10 through 13.

Figure 18:
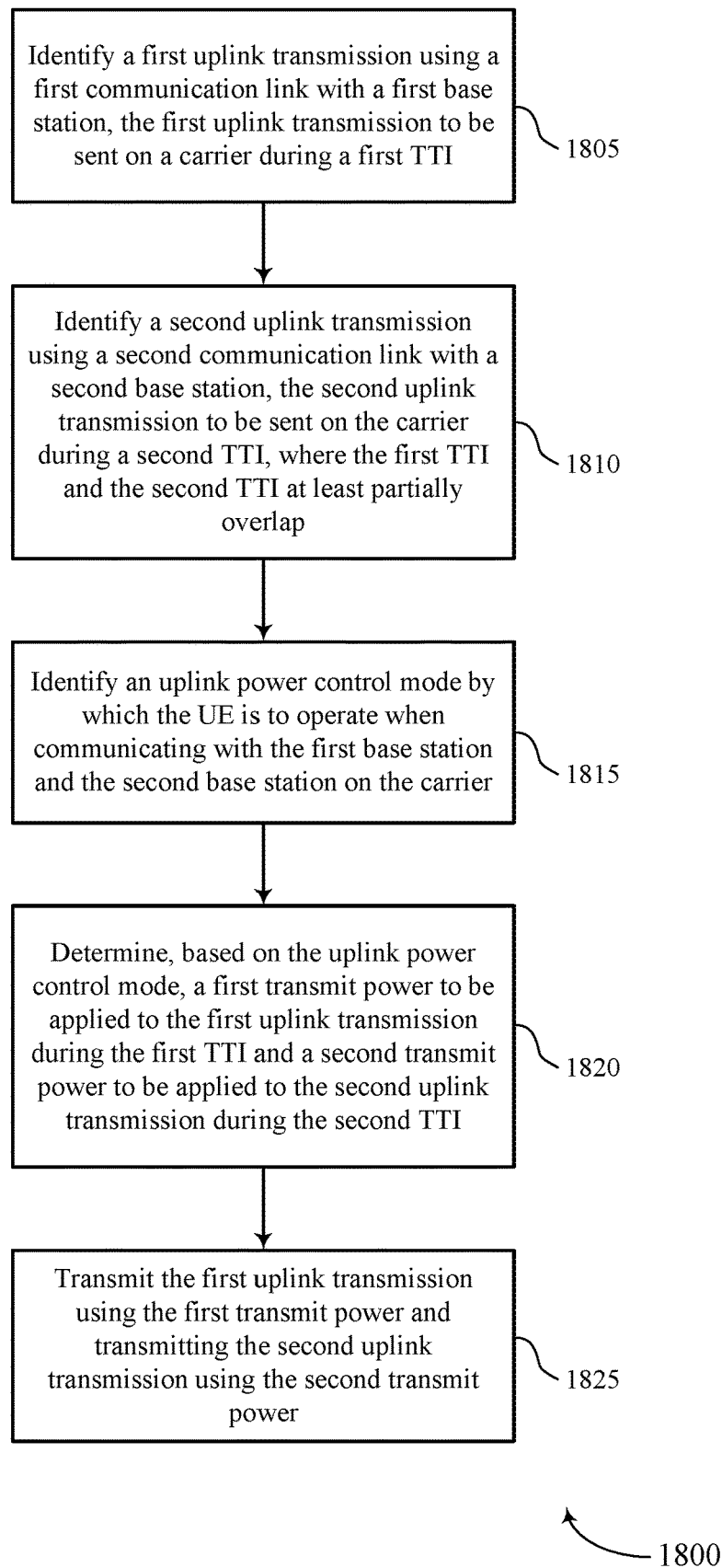

FIG. 18 shows a flowchart illustrating a method 1800 in accordance with aspects of the present disclosure. The operations of method 1800 may be implemented by a UE 115 or its components as described herein. For example, the operations of method 1800 may be performed by a UE control monitoring and power control manager as described with reference to FIGS. 6 through 9. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may identify a first uplink transmission using a first communication link with a first base station 105, the first uplink transmission to be sent on a carrier during a first TTI. The operations of 1805 may be performed according to the methods described herein. In certain examples, aspects of the operations of 1805 may be performed by an uplink transmission component as described with reference to FIGS. 6 through 9.

At 1810 the UE 115 may identify a second uplink transmission using a second communication link with a second base station 105, the second uplink transmission to be sent on the carrier during a second TTI, where the first TTI and the second TTI at least partially overlap. The operations of 1810 may be performed according to the methods described herein. In certain examples, aspects of the operations of 1810 may be performed by an uplink transmission component as described with reference to FIGS. 6 through 9.

At 1815 the UE 115 may identify an uplink power control mode by which the UE 115 is to operate when communicating with the first base station 105 and the second base station 105 on the carrier. The operations of 1815 may be performed according to the methods described herein. In certain examples, aspects of the operations of 1815 may be performed by a power control component as described with reference to FIGS. 6 through 9.

At 1820 the UE 115 may determine, based on the uplink power control mode, a first transmit power to be applied to the first uplink transmission during the first TTI and a second transmit power to be applied to the second uplink transmission during the second TTI. The operations of 1820 may be performed according to the methods described herein. In certain examples, aspects of the operations of 1820 may be performed by a transmit power manager as described with reference to FIGS. 6 through 9.

At 1825 the UE 115 may transmit the first uplink transmission using the first transmit power and transmitting the second uplink transmission using the second transmit power. The operations of 1825 may be performed according to the methods described herein. In certain examples, aspects of the operations of 1825 may be performed by a transmit power manager as described with reference to FIGS. 6 through 9.

Figure 19:
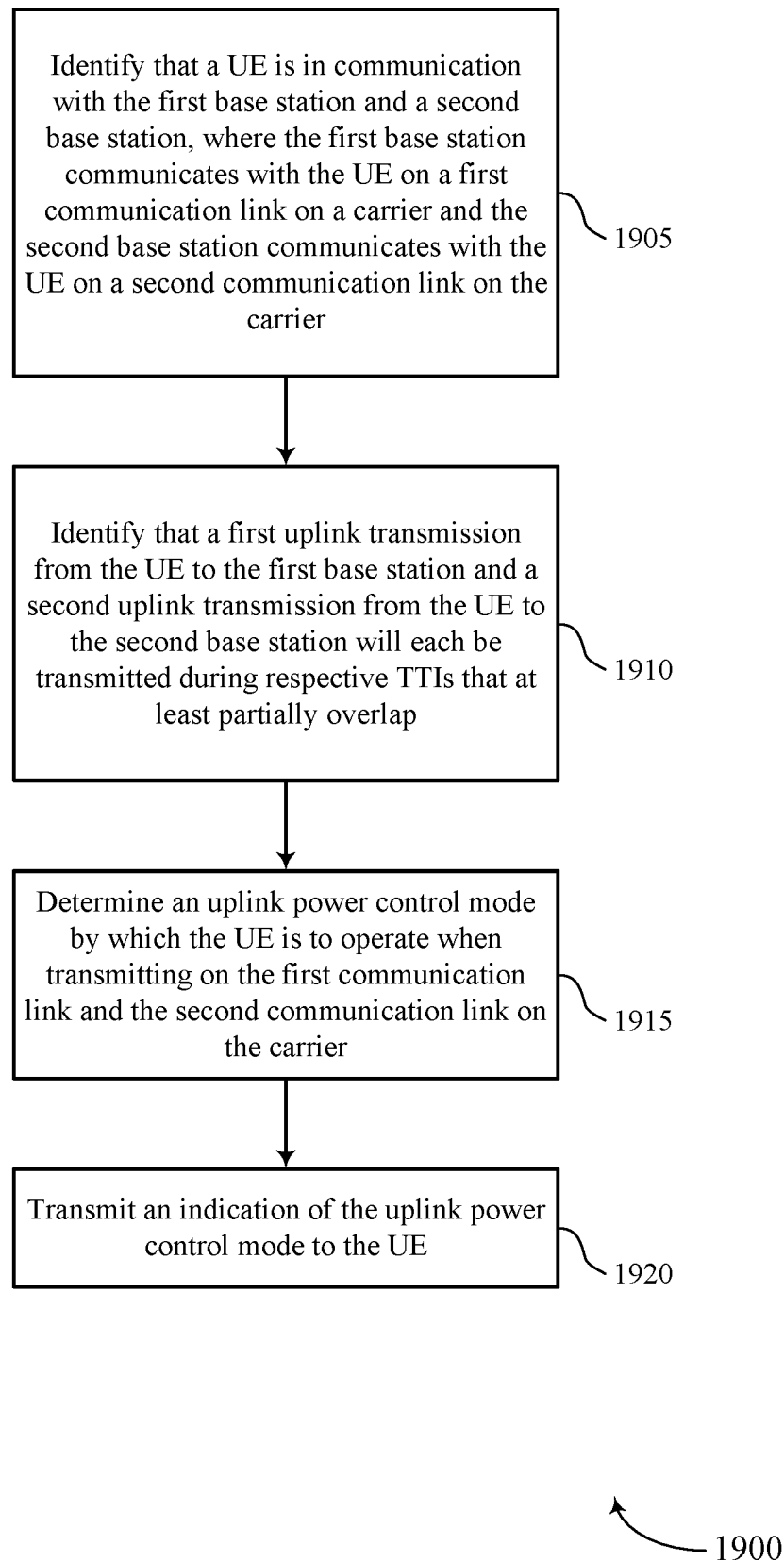

FIG. 19 shows a flowchart illustrating a method 1900 in accordance with aspects of the present disclosure. The operations of method 1900 may be implemented by a base station 105 (e.g., a first base station 105) or its components as described herein. For example, the operations of method 1900 may be performed by a base station control monitoring and power control manager as described with reference to FIGS. 10 through 13. In some examples, a base station 105 may execute a set of codes to control the functional elements of the device to perform the functions described herein. Additionally or alternatively, the base station 105 may perform aspects of the functions described herein using special-purpose hardware.

At 1905 the first base station 105 may identify that a UE 115 is in communication with the first base station 105 and a second base station 105, where the first base station 105 communicates with the UE 115 on a first communication link on a carrier and the second base station 105 communicates with the UE 115 on a second communication link on the carrier. The operations of 1905 may be performed according to the methods described herein. In certain examples, aspects of the operations of 1905 may be performed by a communications manager as described with reference to FIGS. 10 through 13.

At 1910 the first base station 105 may identify that a first uplink transmission from the UE to the first base station 105 and a second uplink transmission from the UE 115 to the second base station 105 will each be transmitted during respective TTIs that at least partially overlap. The operations of 1910 may be performed according to the methods described herein. In certain examples, aspects of the operations of 1910 may be performed by an overlapping transmission manager as described with reference to FIGS. 10 through 13.

At 1915 the first base station 105 may determine an uplink power control mode by which the UE 115 is to operate when transmitting on the first communication link and the second communication link on the carrier. The operations of 1915 may be performed according to the methods described herein. In certain examples, aspects of the operations of 1915 may be performed by a power control mode manager as described with reference to FIGS. 10 through 13.

At 1920 the first base station 105 may transmit an indication of the uplink power control mode to the UE 115. The operations of 1920 may be performed according to the methods described herein. In certain examples, aspects of the operations of 1920 may be performed by a power control mode manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first downlink transmission from a first base station via a first communication link, the first downlink transmission received on a carrier during a first transmission time interval (TTI);
   receiving a second downlink transmission from a second base station via a second communication link, the second downlink transmission received on the carrier during a second TTI, wherein the first TTI and the second TTI at least partially overlap;
   identifying a set of search candidates within the first TTI and within the second TTI, wherein a number or timing of the set of search candidates is based at least in part on the first TTI and the second TTI partially overlapping; and
   monitoring the set of search candidates for respective control information from the first base station and the second base station.

2. The method of claim 1, wherein identifying the set of search candidates comprises:
   identifying a restricted number of search candidates within each of the first TTI and the second TTI with respect to non-overlapping TTIs received by the UE from the first base station and the second base station.

3. The method of claim 2, wherein a sum of the restricted number of search candidates within the first TTI and the second TTI is less than or equal to a threshold number of search candidates.

4. The method of claim 1, wherein identifying the set of search candidates comprises:
   identifying a first subset of search candidates within the first TTI; and
   identifying a second subset of search candidates within the second TTI, wherein the second subset of search candidates is non-overlapping with the first TTI.

5. The method of claim 4, wherein the second TTI comprises a mini-slot including a time-shifted control resource set corresponding to the second subset of search candidates.

6. The method of claim 4, wherein the second TTI comprises two or more mini-slots that each include a control resource set corresponding to the second subset of search candidates, a first mini-slot of the two or more mini-slots including a time-shifted control resource set that is contiguous with a subsequent control resource set of a subsequent mini-slot.

7. The method of claim 1, further comprising:
   identifying a time difference between the first downlink transmission and the second downlink transmission; and
   transmitting an indication of the time difference to the first base station, the second base station, or a combination thereof.

8. The method of claim 7, wherein the indication of the time difference is transmitted via radio resource control (RRC) messaging, a medium access control (MAC) control element (CE), uplink control information, or a combination thereof.

9. The method of claim 1, wherein the second base station has a non-ideal backhaul link with the first base station.

10. The method of claim 1, wherein the first downlink transmission and the second downlink transmission are asynchronous.

11. The method of claim 1, wherein the first communication link and the second communication link comprise respective beam links with the UE.

12. A method for wireless communication at a first base station, comprising:
   identifying that a user equipment (UE) is in communication with the first base station and a second base station;
   identifying that a first downlink transmission from the first base station to the UE and a second downlink transmission from the second base station to the UE will each be transmitted during respective transmission time intervals (TTIs) that at least partially overlap;
   determining a control monitoring configuration for a number or timing of a set of search candidates based at least in part on the respective TTIs that at least partially overlap; and
   transmitting the first downlink transmission comprising the set of search candidates in accordance with the control monitoring configuration.

13. The method of claim 12, wherein determining the control monitoring configuration comprises:
   determining a restricted number of search candidates within a first TTI of the first downlink transmission with respect to non-overlapping TTIs transmitted by the first base station and the second base station.

14. The method of claim 13, wherein a sum of the restricted number of search candidates within the first TTI and a number of search candidates of a second TTI of the second downlink transmission is less than or equal to a threshold number of search candidates, wherein the first TTI and the second TTI at least partially overlap.

15. The method of claim 12, wherein determining the control monitoring configuration comprises:
    determining a timing offset for the set of search candidates, the method further comprising:
    applying the timing offset to the set of search candidates such that the set of search candidates are non-overlapping with a TTI of the second downlink transmission.

16. The method of claim 15, further comprising:
    transmitting the set of search candidates within two or more mini-slots that each include a control resource set corresponding to the set of search candidates, a first mini-slot of the two or more mini-slots including a time-shifted control resource set that is contiguous with a subsequent control resource set of a subsequent mini-slot.

17. The method of claim 15, further comprising:
    transmitting the set of search candidates within a mini-slot of the first downlink transmission, wherein the mini-slot comprises a time-shifted control resource set corresponding to the set of search candidates.

18. The method of claim 12, further comprising:
    receiving, from the UE, an indication of a time difference between downlink transmissions received at the UE, wherein the timing of the set of search candidates is based at least in part on the time difference.

19. The method of claim 18, wherein the indication of the time difference is received via radio resource control (RRC) messaging, a medium access control (MAC) control element (CE), uplink control information, or a combination thereof.

20. The method of claim 12, wherein the second base station has a non-ideal backhaul link with the first base station.

21. The method of claim 12, wherein the first downlink transmission and the second downlink transmission are asynchronous.

22. A method for wireless communication at a user equipment (UE), comprising:
    identifying a first uplink transmission using a first communication link with a first base station, the first uplink transmission to be sent on a carrier during a first transmission time interval (TTI);
    identifying a second uplink transmission using a second communication link with a second base station, the second uplink transmission to be sent on the carrier during a second TTI, wherein the first TTI and the second TTI at least partially overlap;
    identifying an uplink power control mode by which the UE is to operate when communicating with the first base station and the second base station on the carrier;
    determining, based at least in part on the uplink power control mode, a first transmit power to be applied to the first uplink transmission during the first TTI and a second transmit power to be applied to the second uplink transmission during the second TTI; and
    transmitting the first uplink transmission using the first transmit power and transmitting the second uplink transmission using the second transmit power.

23. The method of claim 22, further comprising:
    identifying a minimum reserved transmit power and a maximum transmit power, wherein each of the first transmit power and the second transmit power are equal to at least the minimum reserved transmit power; and
    determining a remaining power based on a difference between the maximum transmit power and a sum of the first transmit power and the second transmit power, wherein the remaining power is shared between the first uplink transmission and the second uplink transmission.

24. The method of claim 23, wherein the remaining power is shared between the first uplink transmission and the second uplink transmission based at least in part on a priority of the first communication link and a priority of the second communication link.

25. The method of claim 22, further comprising:
    identifying a minimum reserved transmit power and a maximum transmit power, wherein each of the first transmit power and the second transmit power are equal to at least the minimum reserved transmit power; and
    determining a remaining power based on a difference between the maximum transmit power and a sum of the first transmit power and the second transmit power, the remaining power allocated to an uplink transmission that occurs temporally first.

26. The method of claim 22, wherein the first transmit power is based at least in part on a beam strength or a first beam index of the first communication link, and wherein the second transmit power is based at least in part on a beam strength or a second beam index of the second communication link.

27. The method of claim 22, further comprising:
    determining a capability of the UE to support the uplink power control mode; and
    transmitting an indication of the determined capability to the first base station, the second base station, or a combination thereof.

28. The method of claim 22, further comprising:
    determining a timing threshold associated with a capability of the UE to support the uplink power control mode; and
    transmitting an indication of the timing threshold to the first base station, the second base station, or a combination thereof.

29. The method of claim 22, further comprising:
    receiving an indication of the uplink power control mode from a base station, wherein the indication is received via radio resource control (RRC) messaging, a medium access control (MAC) control element (CE), downlink control information (DCI), or a combination thereof.

30. A method for wireless communication at a first base station, comprising:
    identifying that a user equipment (UE) is in communication with the first base station and a second base station, wherein the first base station communicates with the UE on a first communication link on a carrier and the second base station communicates with the UE on a second communication link on the carrier;
    identifying that a first uplink transmission from the UE to the first base station and a second uplink transmission from the UE to the second base station will each be transmitted during respective transmission time intervals (TTIs) that at least partially overlap;
    determining an uplink power control mode by which the UE is to operate when transmitting on the first communication link and the second communication link on the carrier; and
    transmitting an indication of the uplink power control mode to the UE.

31. The method of claim 30, wherein the uplink power control mode comprises a minimum reserved transmit power applied to each of the first communication link and the second communication link; and wherein a remaining power that is based on a difference between a maximum transmit power and a sum of transmit powers applied to each of the first communication link and the second communication link is shared between the first communication link and the second communication link.

32. The method of claim 31, wherein the remaining power is shared between the first uplink transmission and the second uplink transmission based at least in part on a priority of the first communication link and a priority of the second communication link.

33. The method of claim 30, wherein the uplink power control mode comprises a minimum reserved transmit power applied to each of the first communication link and the second communication link; and
wherein a remaining power that is based on a difference between a maximum transmit power and a sum of transmit powers applied to each of the first communication link and the second communication link is allocated to an uplink communication that occurs temporally first.

34. The method of claim 30, further comprising:
receiving an indication of a capability of the UE to support the uplink power control mode; and
determining the uplink power control mode based at least in part on the capability.

35. The method of claim 30, further comprising:
receiving an indication of a timing threshold associated with a capability of the UE to support the uplink power control mode; and
determining the uplink power control mode based at least in part on the timing threshold.

36. The method of claim 30, wherein transmitting the indication of the uplink power control mode comprises:
transmitting the indication of the uplink power control mode via radio resource control (RRC) messaging, a medium access control (MAC) control element (CE), downlink control information (DCI), or a combination thereof.

37. An apparatus for wireless communication, comprising:
means for receiving a first downlink transmission from a first base station via a first communication link, the first downlink transmission received on a carrier during a first transmission time interval (TTI);
means for receiving a second downlink transmission from a second base station via a second communication link, the second downlink transmission received on the carrier during a second TTI, wherein the first TTI and the second TTI at least partially overlap;
means for identifying a set of search candidates within the first TTI and within the second TTI, wherein a number or timing of the set of search candidates is based at least in part on the first TTI and the second TTI partially overlapping; and
means for monitoring the set of search candidates for respective control information from the first base station and the second base station.

38. An apparatus for wireless communication, comprising:
means for identifying that a user equipment (UE) is in communication with a first base station and a second base station;
means for identifying that a first downlink transmission from the first base station to the UE and a second downlink transmission from the second base station to the UE will each be transmitted during respective transmission time intervals (TTIs) that at least partially overlap;
means for determining a control monitoring configuration for a number or timing of a set of search candidates based at least in part on the respective TTIs that at least partially overlap; and
means for transmitting the first downlink transmission comprising the set of search candidates in accordance with the control monitoring configuration.

39. An apparatus for wireless communication, comprising:
means for identifying a first uplink transmission using a first communication link with a first base station, the first uplink transmission to be sent on a carrier during a first transmission time interval (TTI);
means for identifying a second uplink transmission using a second communication link with a second base station, the second uplink transmission to be sent on the carrier during a second TTI, wherein the first TTI and the second TTI at least partially overlap;
means for identifying an uplink power control mode by which a user equipment (UE) is to operate when communicating with the first base station and the second base station on the carrier;
means for determining, based at least in part on the uplink power control mode, a first transmit power to be applied to the first uplink transmission during the first TTI and a second transmit power to be applied to the second uplink transmission during the second TTI; and
means for transmitting the first uplink transmission using the first transmit power and transmitting the second uplink transmission using the second transmit power.

40. An apparatus for wireless communication, comprising:
means for identifying that a user equipment (UE) is in communication with a first base station and a second base station, wherein the first base station communicates with the UE on a first communication link on a carrier and the second base station communicates with the UE on a second communication link on the carrier;
means for identifying that a first uplink transmission from the UE to the first base station and a second uplink transmission from the UE to the second base station will each be transmitted during respective transmission time intervals (TTIs) that at least partially overlap;
means for determining an uplink power control mode by which the UE is to operate when transmitting on the first communication link and the second communication link on the carrier; and
means for transmitting an indication of the uplink power control mode to the UE.

41. An apparatus for wireless communication, comprising:
a processor;
memory in electronic communication with the processor;
a receiver configured to receive a first downlink transmission from a first base station via a first communication link, the first downlink transmission received on a carrier during a first transmission time interval (TTI); and
receive a second downlink transmission from a second base station via a second communication link, the second downlink transmission received on the carrier during a second TTI, wherein the first TTI and the second TTI at least partially overlap; and instructions stored in the memory and executable by the processor to cause the apparatus to:
  identify a set of search candidates within the first TTI and within the second TTI, wherein a number or timing of the set of search candidates is based at least in part on the first TTI and the second TTI partially overlapping; and
  monitor the set of search candidates for respective control information from the first base station and the second base station.

42. The apparatus of claim 41, wherein the instructions to identify the set of search candidates are executable by the processor to cause the apparatus to:
  identify a restricted number of search candidates within each of the first TTI and the second TTI with respect to non-overlapping TTIs received by the UE from the first base station and the second base station.

43. The apparatus of claim 41, wherein the instructions to identify the set of search candidates are executable by the processor to cause the apparatus to:
  identify a first subset of search candidates within the first TTI; and
  identify a second subset of search candidates within the second TTI, wherein the second subset of search candidates is non-overlapping with the first TTI.

44. The apparatus of claim 41, wherein the instructions are further executable by the processor to cause the apparatus to:
  identify a time difference between the first downlink transmission and the second downlink transmission, the apparatus further comprising:
  a transceiver configured to transmit an indication of the time difference to the first base station, the second base station, or a combination thereof.

45. An apparatus for wireless communication, comprising:
  a processor;
  memory in electronic communication with the processor;
  instructions stored in the memory and executable by the processor to cause the apparatus to:
    identify that a user equipment (UE) is in communication with a first base station and a second base station;
    identify that a first downlink transmission from the first base station to the UE and a second downlink transmission from the second base station to the UE will each be transmitted during respective transmission time intervals (TTIs) that at least partially overlap;
    determine a control monitoring configuration for a number or timing of a set of search candidates based at least in part on the respective TTIs that at least partially overlap; and
  a transmitter configured to transmit the first downlink transmission comprising the set of search candidates in accordance with the control monitoring configuration.

46. The apparatus of claim 45, wherein the instructions to determine the control monitoring configuration are executable by the processor to cause the apparatus to:
  determine a restricted number of search candidates within a first TTI of the first downlink transmission with respect to non-overlapping TTIs transmitted by the first base station and the second base station.

47. The apparatus of claim 46, wherein a sum of the restricted number of search candidates within the first TTI and a number of search candidates of a second TTI of the second downlink transmission is less than or equal to a threshold number of search candidates, wherein the first TTI and the second TTI at least partially overlap.

48. The apparatus of claim 45, wherein the instructions to determine the control monitoring configuration are executable by the processor to cause the apparatus to:
  determine a timing offset for the set of search candidates, the instructions further executable by the processor to cause the apparatus to:
  apply the timing offset to the set of search candidates such that the set of search candidates are non-overlapping with a TTI of the second downlink transmission.

49. The apparatus of claim 45, further comprising:
  a transceiver configured to receive, from the UE, an indication of a time difference between downlink transmissions received at the UE, wherein the timing of the set of search candidates is based at least in part on the time difference.

50. An apparatus for wireless communication, comprising:
  a processor;
  memory in electronic communication with the processor;
  instructions stored in the memory and executable by the processor to cause the apparatus to:
    identify a first uplink transmission using a first communication link with a first base station, the first uplink transmission to be sent on a carrier during a first transmission time interval (TTI);
    identify a second uplink transmission using a second communication link with a second base station, the second uplink transmission to be sent on the carrier during a second TTI, wherein the first TTI and the second TTI at least partially overlap;
    identify an uplink power control mode by which a user equipment (UE) is to operate when communicating with the first base station and the second base station on the carrier;
    determine, based at least in part on the uplink power control mode, a first transmit power to be applied to the first uplink transmission during the first TTI and a second transmit power to be applied to the second uplink transmission during the second TTI; and
  a transmitter configured to transmit the first uplink transmission using the first transmit power and transmitting the second uplink transmission using the second transmit power.

51. The apparatus of claim 50, wherein the instructions are further executable by the processor to cause the apparatus to:
  identify a minimum reserved transmit power and a maximum transmit power, wherein each of the first transmit power and the second transmit power are equal to at least the minimum reserved transmit power; and
  determine a remaining power based on a difference between the maximum transmit power and a sum of the first transmit power and the second transmit power, wherein the remaining power is shared between the first uplink transmission and the second uplink transmission.

52. The apparatus of claim 50, wherein the instructions are further executable by the processor to cause the apparatus to:
  identify a minimum reserved transmit power and a maximum transmit power, wherein each of the first transmit power and the second transmit power are equal to at least the minimum reserved transmit power; and
  determine a remaining power based on a difference between the maximum transmit power and a sum of the first transmit power and the second transmit power, the remaining power allocated to an uplink transmission that occurs temporally first.

53. The apparatus of claim 50, wherein the instructions are further executable by the processor to cause the apparatus to:
determine a capability of the UE to support the uplink power control mode, the apparatus further comprising a transmitter configured to transmit an indication of the determined capability to the first base station, the second base station, or a combination thereof.

54. An apparatus for wireless communication, comprising:
a processor;
memory in electronic communication with the processor;
instructions stored in the memory and executable by the processor to cause the apparatus to:
identify that a user equipment (UE) is in communication with a first base station and a second base station, wherein the first base station communicates with the UE on a first communication link on a carrier and the second base station communicates with the UE on a second communication link on the carrier;
identify that a first uplink transmission from the UE to the first base station and a second uplink transmission from the UE to the second base station will each be transmitted during respective transmission time intervals (TTIs) that at least partially overlap;
determine an uplink power control mode by which the UE is to operate when transmitting on the first communication link and the second communication link on the carrier; and
a transmitter configured to transmit an indication of the uplink power control mode to the UE.

55. The apparatus of claim 54, wherein the uplink power control mode comprises a minimum reserved transmit power applied to each of the first communication link and the second communication link; and
wherein a remaining power that is based on a difference between a maximum transmit power and a sum of transmit powers applied to each of the first communication link and the second communication link is shared between the first communication link and the second communication link.

56. The apparatus of claim 54, wherein the uplink power control mode comprises a minimum reserved transmit power applied to each of the first communication link and the second communication link; and
wherein a remaining power that is based on a difference between a maximum transmit power and a sum of transmit powers applied to each of the first communication link and the second communication link is allocated to an uplink communication that occurs temporally first.

57. The apparatus of claim 54, further comprising:
a receiver configured to receive an indication of a capability of the UE to support the uplink power control mode, wherein the instructions are further executable by the processor to cause the apparatus to
determine the uplink power control mode based at least in part on the capability.

58. The apparatus of claim 54, further comprising:
a receiver configured to receive an indication of a timing threshold associated with a capability of the UE to support the uplink power control mode, wherein the instructions are further executable by the processor to cause the apparatus to
determine the uplink power control mode based at least in part on the timing threshold
determine an uplink power control mode by which the UE is to operate when transmitting on the first communication link and the second communication link on the carrier; and wherein the transmitter is configured to:
transmit an indication of the uplink power control mode to the UE.

* * * * *